United States Patent
Lee et al.

(10) Patent No.: US 10,193,673 B2
(45) Date of Patent: Jan. 29, 2019

(54) METHOD FOR GENERATING AND TRANSMITTING PILOT SEQUENCE BY FORMING ASYMMETRIC SEQUENCE SET BY MEANS OF SHIFTING ON TIME AXIS IN WIRELESS COMMUNICATION SYSTEM

(71) Applicant: LG ELECTRONICS INC., Seoul (KR)

(72) Inventors: Kilbom Lee, Seoul (KR); Jiwon Kang, Seoul (KR); Jinsoo Choi, Seoul (KR); Wookbong Lee, Seoul (KR); Dongguk Lim, Seoul (KR); Hangyu Cho, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/326,026

(22) PCT Filed: Aug. 19, 2015

(86) PCT No.: PCT/KR2015/008664
§ 371 (c)(1),
(2) Date: Jan. 12, 2017

(87) PCT Pub. No.: WO2016/028085
PCT Pub. Date: Feb. 25, 2016

(65) Prior Publication Data
US 2017/0214506 A1 Jul. 27, 2017

Related U.S. Application Data
(60) Provisional application No. 62/039,426, filed on Aug. 20, 2014.

(51) Int. Cl.
*H04W 4/00* (2018.01)
*H04L 5/00* (2006.01)
(Continued)

(52) U.S. Cl.
CPC ........ *H04L 5/0048* (2013.01); *H04L 27/2613* (2013.01); *H04W 72/042* (2013.01); *H04W 84/12* (2013.01)

(58) Field of Classification Search
CPC ............. H04L 5/0048; H04L 27/2613; H04W 72/042; H04W 84/12
See application file for complete search history.

(56) References Cited

U.S. PATENT DOCUMENTS

| 2002/0118771 A1* | 8/2002 | Larsson ................ H04L 1/0618 375/267 |
| 2008/0056175 A1* | 3/2008 | Jung ...................... H04B 7/155 370/315 |
| 2012/0026967 A1 | 2/2012 | Pajukoski et al. |

FOREIGN PATENT DOCUMENTS

| KR | 1020070077008 | 7/2007 |
| KR | 100863897 | 10/2008 |

(Continued)

OTHER PUBLICATIONS

PCT International Application No. PCT/KR2015/008664, Written Opinion of the International Searching Authority dated Dec. 15, 2015, 18 pages.

*Primary Examiner* — Phuc H Tran
(74) *Attorney, Agent, or Firm* — Lee, Hong, Degerman, Kang & Waimey

(57) ABSTRACT

One embodiment of the present invention provides a transmitter and a pilot sequence transmission method comprising: generating an asymmetric sequence set comprising a plurality of pilot sequences which have been circular shifted by irregular intervals on a time axis; mapping, to the respective pilot sequences included in the asymmetric sequence set, additional information that is shown by using shared bits and (Continued)

non-shared bits; and selecting any one pilot sequence selected from the asymmetric sequence set and transmitting same to a receiver.

14 Claims, 23 Drawing Sheets

(51) Int. Cl.
*H04L 27/26* (2006.01)
*H04W 72/04* (2009.01)
*H04W 84/12* (2009.01)

(56) References Cited

FOREIGN PATENT DOCUMENTS

| KR | 1020100009643 | 1/2010 |
| WO | 2013191447 | 12/2013 |

* cited by examiner

US 10,193,673 B2

METHOD FOR GENERATING AND TRANSMITTING PILOT SEQUENCE BY FORMING ASYMMETRIC SEQUENCE SET BY MEANS OF SHIFTING ON TIME AXIS IN WIRELESS COMMUNICATION SYSTEM

CROSS-REFERENCE TO RELATED APPLICATIONS

This application is the National Stage filing under 35 U.S.C. 371 of International Application No. PCT/KR2015/008664, filed on Aug. 19, 2015, which claims the benefit of U.S. Provisional Application No. 62/039,426, filed on Aug. 20, 2014, the contents of which are hereby incorporated by reference herein in their entirety.

TECHNICAL FIELD

The following description relates to a wireless communication system and, more specifically, to a method and apparatus for generating and transmitting a pilot sequence by configuring an asymmetric sequence set through shifting in a time domain in a wireless LAN system.

BACKGROUND ART

Recently, with development of information communication technology, various wireless communication technologies have been developed. Among others, a wireless local area network (WLAN) enables wireless access to the Internet using a portable terminal such as a personal digital assistant (PDA), a laptop, a portable multimedia player (PMP) in a home, an enterprise or a specific service provision area based on radio frequency technology.

In order to overcome limitations in communication rate which have been pointed out as weakness of a WLAN, in recent technical standards, a system for increasing network speed and reliability and extending wireless network distance has been introduced. For example, in IEEE 802.11n, multiple input and multiple output (MIMO) technology using multiple antennas in a transmitter and a receiver has been introduced in order to support high throughput (HT) with a maximum data rate of 540 Mbps or more, to minimize transmission errors, and to optimize data rate.

As next-generation communication technology, machine-to-machine (M2M) communication technology has been discussed. Even in an IEEE 802.11 WLAN system, technical standards supporting M2M communication have been developed as IEEE 802.11ah. In M2M communication, a scenario in which a small amount of data is communicated at a low rate may be considered in an environment in which many apparatuses are present.

Communication in a WLAN system is performed in a medium shared between all apparatuses. As in M2M communication, if the number of apparatuses is increased, in order to reduce unnecessary power consumption and interference, a channel access mechanism needs to be more efficiently improved.

DISCLOSURE

Technical Problem

An object of the present invention devised to solve the problem lies in efficient information transmission through design of an asymmetric sequence set.

Another object of the present invention is to correlate a shifting value difference with importance of information to be delivered in an asymmetric sequence set so as to reflect importance of information in misrecognition probability.

Another object of the present invention is to set a shifting value to a fraction in a procedure of generating an asymmetric sequence set to increase the quantity of information to be additionally transmitted.

The technical problems solved by the present invention are not limited to the above technical problems and other technical problems which are not described herein will become apparent to those skilled in the art from the following description.

Technical Solution

In an aspect of the present invention, a method of transmitting, by a transmitter, a pilot sequence to a receiver in a wireless communication system includes: generating an asymmetric sequence set including a plurality of pilot sequences cyclically shifted at irregular intervals in a frequency domain; mapping additional information represented by different bit values to the respective pilot sequences included in the asymmetric sequence set; and transmitting a pilot sequence selected from the asymmetric sequence set to a receiver, wherein the plurality of pilot sequences is grouped on the basis of shifting values, and the additional information is represented by a shared bit mapped as the same value to grouped pilot sequences and a non-shared bit mapped as different values to grouped pilot sequences.

The generating of the asymmetric sequence set may include generating the plurality of pilot sequences cyclically shifted in the frequency domain by changing phases of vector elements indicating pilot signals in a time domain.

The pilot signals may be shifted in units of a fraction to generate the plurality of pilot sequences.

The plurality of pilot sequences may be grouped in such a manner that pilot sequences having a small shifting value difference are grouped.

Information belonging to a group with high importance may be allocated to the shared bit and information belonging to a group with low importance may be allocated to the non-shared bit.

The group with high importance may include at least one of a packet identifier (ID), a basic service set ID (BSSID), uplink transmission scheduling information, downlink transmission scheduling information and a bandwidth, and the group with low importance may include at least one of the number of transmit antennas, the position of a PDCCH (Physical Downlink Control Channel) and the position of an ePDCCH (evolved PDCCH).

The additional information may be mapped to neighboring pilot sequences such that the additional information has a difference of 1 bit.

In another aspect of the present invention, a transmitter for transmitting a pilot sequence to a receiver in a wireless communication system includes: a transmission unit; a reception unit; and a processor connected to the transmission unit and the reception unit to operate, wherein the processor is configured to generate an asymmetric sequence set including a plurality of pilot sequences cyclically shifted at irregular intervals in a frequency domain, to map additional information represented by different bit values to the respective pilot sequences included in the asymmetric sequence set and to transmit a pilot sequence selected from the asymmetric sequence set to a receiver, and wherein the plurality of pilot sequences is grouped on the basis of shifting values, and the additional information is represented by a shared bit mapped as the same value to grouped pilot sequences and a non-shared bit mapped as different values to grouped pilot sequences.

Advantageous Effects

The embodiments of the present invention have the following effects.

First, it is possible to improve communication efficiency using additional information through a pilot sequence by defining an asymmetric sequence set through cyclic shifting in the time domain.

Second, it is possible to efficiently protect information of high importance by controlling probability of misrecognizing a pilot sequence in consideration of importance of additional information corresponding to the pilot sequence.

Third, it is possible to increase a degree of freedom compared to integer shifting by permitting shifting of a fraction during generation of a sequence set.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE

Figure 1:
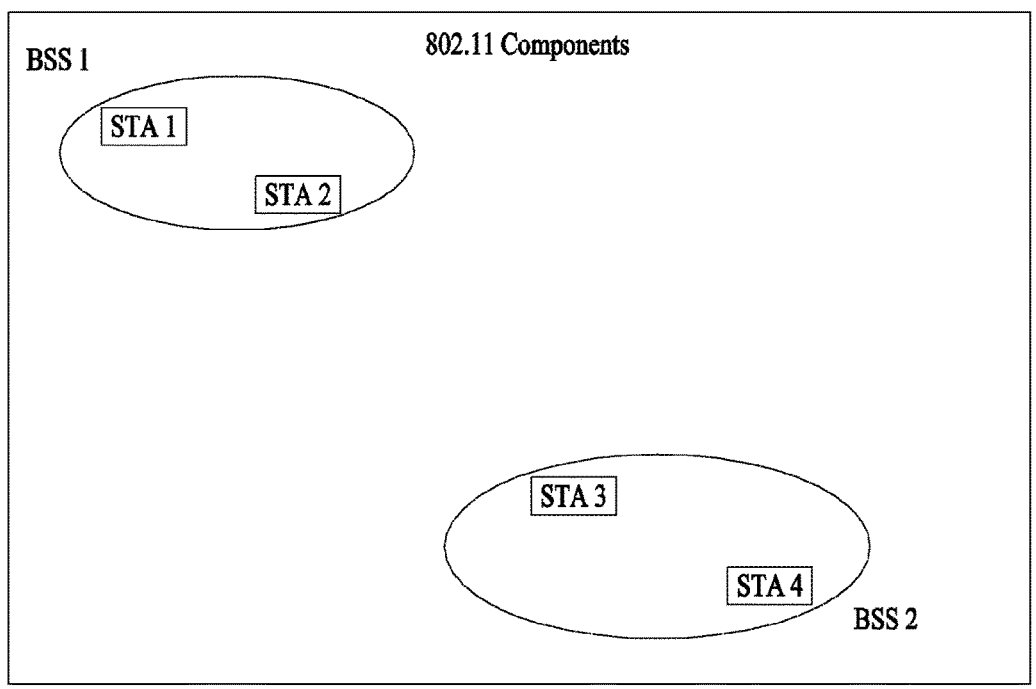
FIG. 1 is a diagram showing an exemplary structure of an IEEE 802.11 system to which the present invention is applicable.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. IEEE 802.11 System Overview
1.1 Structure of WLAN System

FIG. 1 is a diagram showing an exemplary structure of an IEEE 802.11 system to which the present invention is applicable.

An IEEE 802.11 structure may be composed of a plurality of components and a wireless local area network (WLAN) supporting station (STA) mobility transparent to a higher layer may be provided by interaction among the components. A basic service set (BSS) may correspond to a basic component block in an IEEE 802.11 LAN. In FIG. 1, two BSSs (BSS1 and BSS2) are present and each BSS includes two STAs (STA1 and STA2 are included in BSS1 and STA3 and STA4 are included in BSS2) as members. In FIG. 1, an ellipse indicating the BSS indicates a coverage area in which STAs included in the BSS maintains communication. This area may be referred to as a basic service area (BSA). If an STA moves out of a BSA, the STA cannot directly communicate with other STAs in the BSA.

In an IEEE 802.11 LAN, a BSS is basically an independent BSS (IBSS). For example, the IBSS may have only two STAs. In addition, the simplest BSS (BSS1 or BSS2) of FIG. 1, in which other components are omitted, may correspond to a representative example of the IBSS. Such a configuration is possible when STAs can directly perform communication. In addition, such a LAN is not configured in advance but may be configured if a LAN is necessary. This LAN may also be referred to as an ad-hoc network.

If an STA is turned on or off or if an STA enters or moves out of a BSS, the membership of the STA in the BSS may be dynamically changed. An STA may join a BSS using a synchronization process in order to become a member of the BSS. In order to access all services of a BSS based structure, an STA should be associated with the BSS. Such association may be dynamically set and may include use of a distribution system service (DSS).

Figure 2:
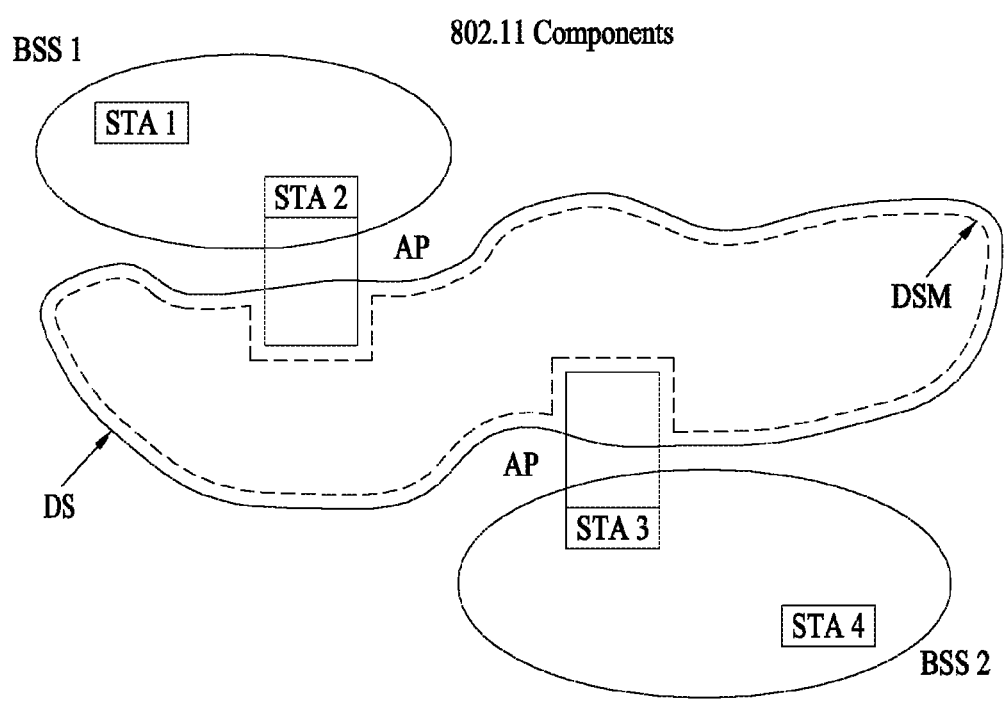
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, a distribution system (DS), a distribution system medium (DSM) and an access point (AP) are added to the structure of FIG. 1.

In a LAN, a direct station-to-station distance may be restricted by PHY performance Although such distance restriction may be possible, communication between stations located at a longer distance may be necessary. In order to support extended coverage, a DS may be configured.

The DS means a structure in which BSSs are mutually connected. More specifically, the BSSs are not independently present as shown in FIG. 1 but the BSS may be present as an extended component of a network including a plurality of BSSs.

The DS is a logical concept and may be specified by characteristics of the DSM. In IEEE 802.11 standards, a wireless medium (WM) and a DSM are logically distinguished. Logical media are used for different purposes and are used by different components. In IEEE 802.11 standards, such media are not restricted to the same or different media. Since plural media are logically different, an IEEE 802.11 LAN structure (a DS structure or another network structure) may be flexible. That is, the IEEE 802.11 LAN structure may be variously implemented and a LAN structure may be independently specified by physical properties of each implementation.

The DS provides seamless integration of a plurality of BSSs and provides logical services necessary to treat an address to a destination so as to support a mobile apparatus.

The AP means an entity which enables associated STAs to access the DS via the WM and has STA functionality. Data transfer between the BSS and the DS may be performed via the AP. For example, STA2 and STA3 shown in FIG. 2 have STA functionality and provide a function enabling associated STAs (STA1 and STA4) to access the DS. In addition, since all APs correspond to STAs, all APs may be addressable entities. An address used by the AP for communication on the WM and an address used by the AP for communication on the DSM may not be equal.

Data transmitted from one of STAs associated with the AP to the STA address of the AP may always be received by an uncontrolled port and processed by an IEEE 802.1X port access entity. In addition, if a controlled port is authenticated, transmission data (or frames) may be transmitted to the DS.

Figure 3:
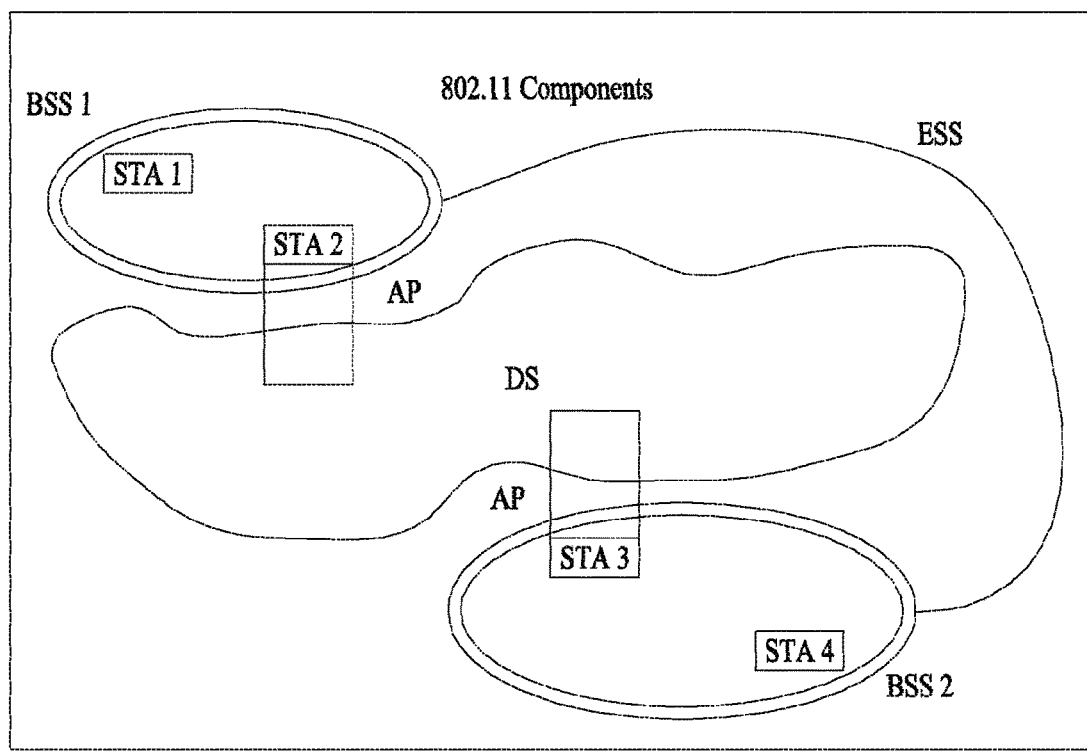
FIG. 3 is a diagram showing another exemplary structure of an IEEE 802.11 system to which the present invention is applicable.

FIG. 3 is a diagram showing another exemplary structure of an IEEE 802.11 system to which the present invention is applicable. In FIG. 3, an extended service set (ESS) for providing wide coverage is added to the structure of FIG. 2.

A wireless network having an arbitrary size and complexity may be composed of a DS and BSSs. In an IEEE 802.11 system, such a network is referred to as an ESS network. The ESS may correspond to a set of BSSs connected to one DS. However, the ESS does not include the DS. The ESS network appears as an IBSS network at a logical link control (LLC) layer. STAs included in the ESS may communicate with each other and mobile STAs may move from one BSS to another BSS (within the same ESS) transparently to the LLC layer.

In IEEE 802.11, relative physical locations of the BSSs in FIG. 3 are not assumed and may be defined as follows. The BSSs may partially overlap in order to provide consecutive coverage. In addition, the BSSs may not be physically connected and a distance between BSSs is not logically restricted. In addition, the BSSs may be physically located at the same location in order to provide redundancy. In addition, one (or more) IBSS or ESS network may be physically present in the same space as one (or more) ESS network. This corresponds to an ESS network type such as a case in which an ad-hoc network operates at a location where the ESS network is present, a case in which IEEE 802.11 networks physically overlapped by different organizations are configured or a case in which two or more different access and security policies are necessary at the same location.

Figure 4:
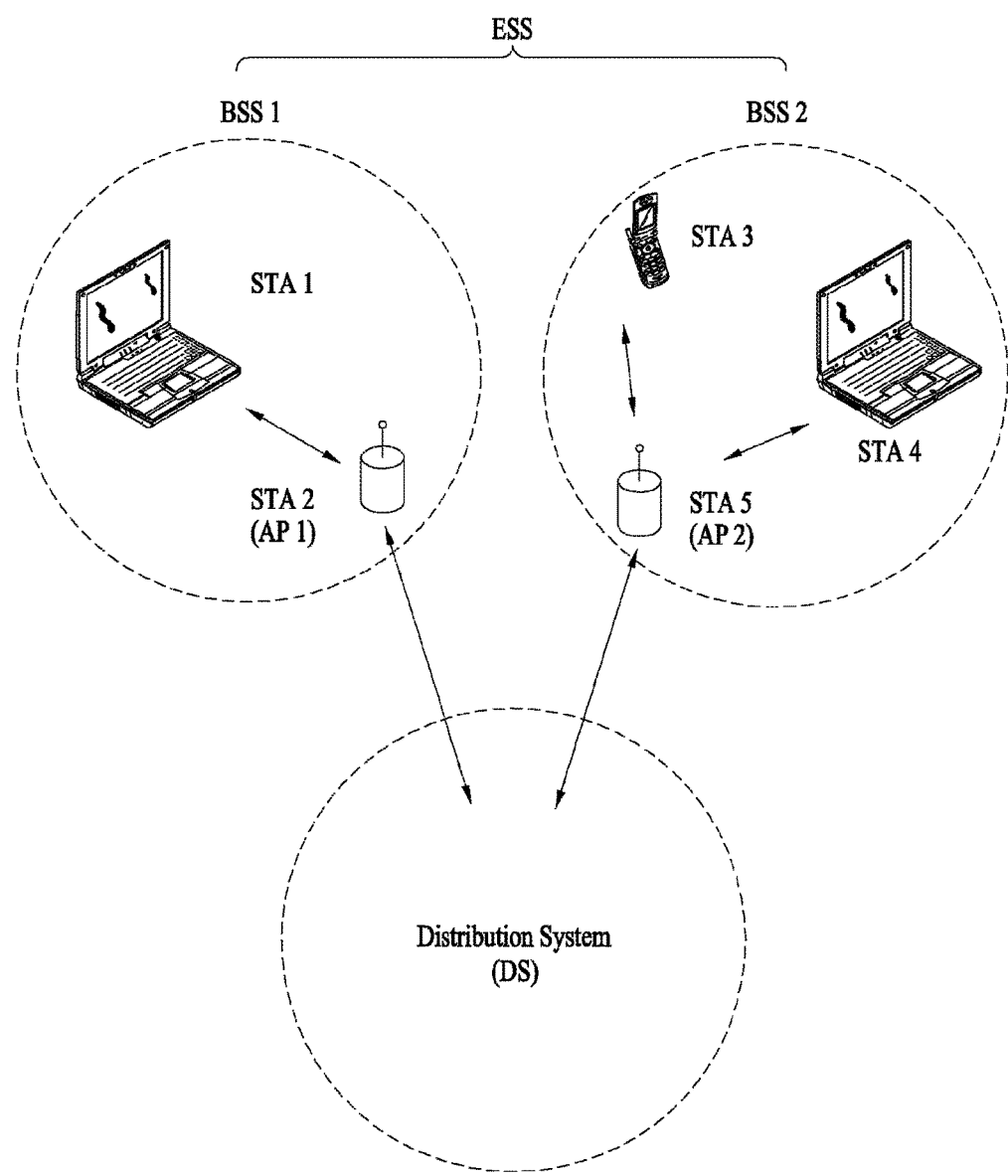
FIG. 4 is a diagram showing an exemplary structure of a WLAN system.

FIG. 4 is a diagram showing an exemplary structure of a WLAN system. FIG. 4 shows an example of an infrastructure BSS including a DS.

In the example of FIG. 4, BSS1 and BSS2 configure an ESS. In the WLAN system, an STA operates according to a MAC/PHY rule of IEEE 802.11. The STA includes an AP STA and a non-AP STA. The non-AP STA corresponds to an apparatus directly handled by a user, such as a laptop or a mobile phone. In the example of FIG. 4, STA1, STA3 and STA4 correspond to the non-AP STA and STA2 and STAS correspond to the AP STA.

In the following description, the non-AP STA may be referred to as a terminal, a wireless transmit/receive unit (WTRU), a user equipment (UE), a mobile station (MS), a mobile terminal or a mobile subscriber station (MSS). In addition, the AP may correspond to a base station (BS), a Node-B, an evolved Node-B (eNB), a base transceiver system (BTS) or a femto BS.

1.2 Link Setup Process

Figure 5:
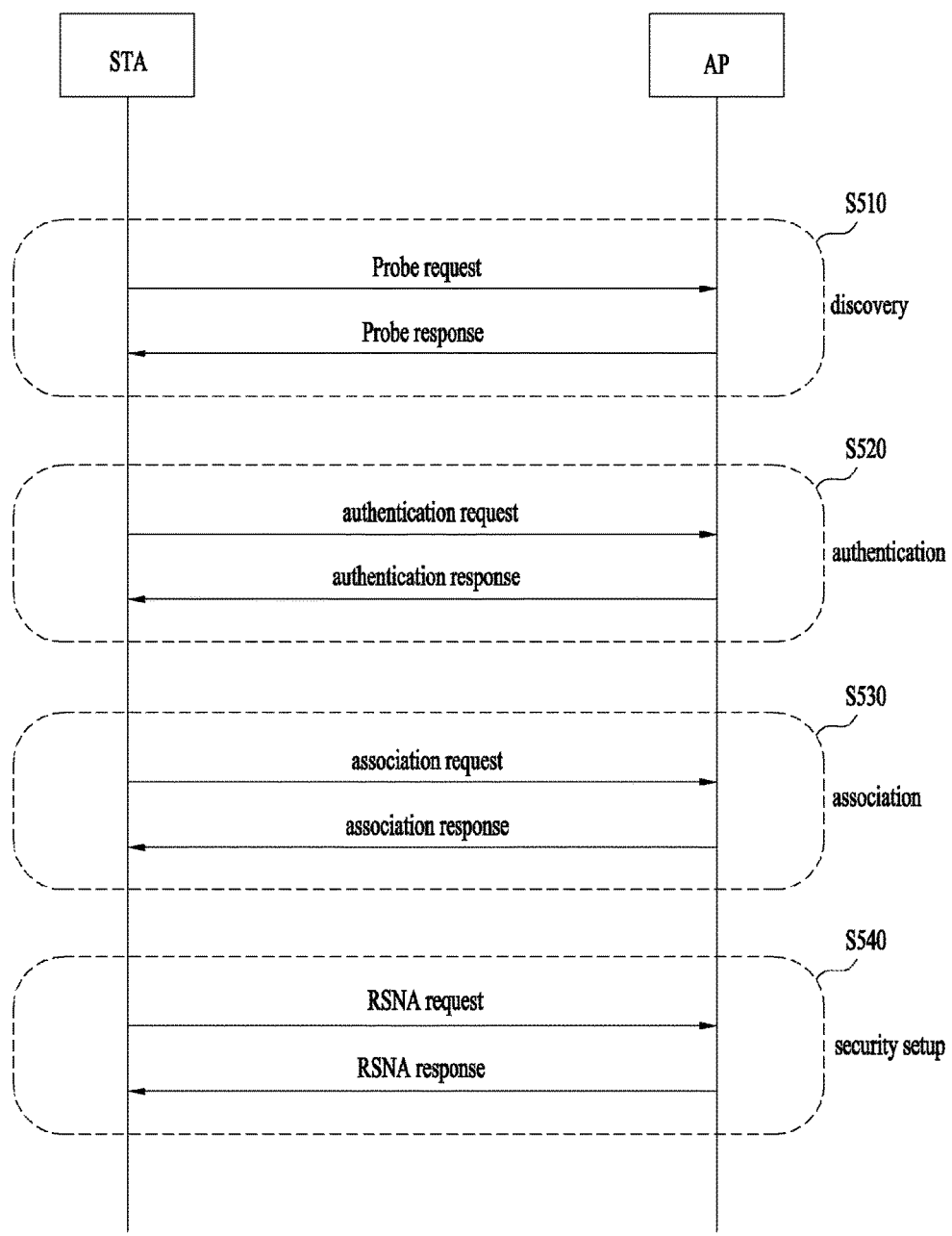
FIG. 5 is a diagram illustrating a link setup process in a WLAN system.

FIG. 5 is a diagram illustrating a general link setup process.

In order to establish a link with respect to a network and perform data transmission and reception, an STA discovers the network, performs authentication, establishes association and performs an authentication process for security. The link setup process may be referred to as a session initiation process or a session setup process. In addition, discovery, authentication, association and security setup of the link setup process may be collectively referred to as an association process.

An exemplary link setup process will be described with reference to FIG. 5.

In step S510, the STA may perform a network discovery operation. The network discovery operation may include a scanning operation of the STA. That is, the STA discovers the network in order to access the network. The STA should identify a compatible network before participating in a wireless network and a process of identifying a network present in a specific area is referred to as scanning. The scanning method includes an active scanning method and a passive scanning method.

In FIG. 5, a network discovery operation including an active scanning process is shown. In active scanning, the STA which performs scanning transmits a probe request frame while moving between channels and waits for a response thereto, in order to detect which AP is present. A responder transmits a probe response frame to the STA, which transmitted the probe request frame, as a response to the probe request frame. The responder may be an STA which lastly transmitted a beacon frame in a BSS of a scanned channel. In the BSS, since the AP transmits the beacon frame, the AP is the responder. In the IBSS, since the STAs in the IBSS alternately transmit the beacon frame, the responder is not fixed. For example, the STA which transmits the probe request frame on a first channel and receives the probe response frame on the first channel stores BSS related information included in the received probe response frame, moves to a next channel (e.g., a second channel) and performs scanning (probe request/response transmission/reception on the second channel) using the same method.

Although not shown in FIG. 5, a scanning operation may be performed using a passive scanning method. In passive scanning, the STA which performs scanning waits for a beacon frame while moving between channels. The beacon frame is a management frame in IEEE 802.11 and is periodically transmitted in order to indicate presence of a wireless network and to enable the STA, which performs scanning, to discover and participate in the wireless network. In the BSS, the AP is responsible for periodically transmitting the beacon frame. In the IBSS, the STAs alternately transmit the beacon frame. The STA which performs scanning receives the beacon frame, stores information about the BSS included in the beacon frame, and records beacon frame information of each channel while moving to another channel. The STA which receives the beacon frame may store BSS related information included in the received beacon frame, move to a next channel and perform scanning on the next channel using the same method.

Active scanning has delay and power consumption less than those of passive scanning.

After the STA has discovered the network, an authentication process may be performed in step S520. Such an authentication process may be referred to as a first authentication process to be distinguished from a security setup operation of step S540.

The authentication process includes a process of, at the STA, transmitting an authentication request frame to the AP and, at the AP, transmitting an authentication response frame to the STA in response thereto. The authentication frame used for authentication request/response corresponds to a management frame.

The authentication frame may include information about an authentication algorithm number, an authentication transaction sequence number, a status code, a challenge text, a robust security network (RSN), a finite cyclic group, etc. The information may be examples of information included in the authentication request/response frame and may be replaced with other information. The information may further include additional information.

The STA may transmit the authentication request frame to the AP. The AP may determine whether authentication of the STA is allowed, based on the information included in the received authentication request frame. The AP may provide the STA with the authentication result via the authentication response frame.

After the STA is successfully authenticated, an association process may be performed in step S530. The association process includes a process of, at the STA, transmitting an association request frame to the AP and, at the AP, transmitting an association response frame to the STA in response thereto.

For example, the association request frame may include information about various capabilities, beacon listen interval, service set identifier (SSID), supported rates, RSN, mobility domain, supported operating classes, traffic indication map (TIM) broadcast request, interworking service capability, etc.

For example, the association response frame may include information about various capabilities, status code, association ID (AID), supported rates, enhanced distributed channel access (EDCA) parameter set, received channel power indicator (RCPI), received signal to noise indicator (RSNI), mobility domain, timeout interval (association comeback time), overlapping BSS scan parameter, TIM broadcast response, QoS map, etc.

This information is purely exemplary information included in the association request/response frame and may be replaced with other information. This information may further include additional information.

After the STA is successfully authenticated, a security setup process may be performed in step S540. The security setup process of step S540 may be referred to as an authentication process through a robust security network association (RSNA) request/response. The authentication process of step S520 may be referred to as the first authentication process and the security setup process of step S540 may be simply referred to as an authentication process.

The security setup process of step S540 may include a private key setup process through 4-way handshaking of an extensible authentication protocol over LAN (EAPOL) frame. In addition, the security setup process may be performed according to a security method which is not defined in the IEEE 802.11 standard.

2.1 Evolution of WLAN

As a technical standard recently established in order to overcome limitations in communication speed in a WLAN, IEEE 802.11n has been devised. IEEE 802.11n aims at increasing network speed and reliability and extending wireless network distance. More specifically, IEEE 802.11n is based on multiple input and multiple output (MIMO) technology using multiple antennas in a transmitter and a receiver in order to support high throughput (HT) with a maximum data rate of 540 Mbps or more, to minimize transmission errors, and to optimize data rate.

As WLANs have come into widespread use and applications using the same have been diversified, recently, there is a need for a new WLAN system supporting throughput higher than a data rate supported by IEEE 802.11n. A next-generation WLAN system supporting very high throughput (VHT) is a next version (e.g., IEEE 802.11ac) of the IEEE 802.11n WLAN system and is an IEEE 802.11 WLAN system newly proposed in order to support a data rate of 1 Gbps or more at a MAC service access point (SAP).

The next-generation WLAN system supports a multi-user MIMO (MU-MIMO) transmission scheme by which a plurality of STAs simultaneously accesses a channel in order to efficiently use a radio channel According to the MU-MIMO transmission scheme, the AP may simultaneously transmit packets to one or more MIMO-paired STAs.

In addition, support of a WLAN system operation in a whitespace is being discussed. For example, introduction of a WLAN system in a TV whitespace (WS) such as a frequency band (e.g., 54 to 698 MHz) in an idle state due to digitalization of analog TVs is being discussed as the IEEE 802.11af standard. However, this is only exemplary and the whitespace may be incumbently used by a licensed user. The licensed user means a user who is allowed to use a licensed band and may be referred to as a licensed device, a primary user or an incumbent user.

For example, the AP and/or the STA which operate in the WS should provide a protection function to the licensed user. For example, if a licensed user such as a microphone already uses a specific WS channel which is a frequency band divided on regulation such that a WS band has a specific bandwidth, the AP and/or the STA cannot use the frequency band corresponding to the WS channel in order to protect the licensed user. In addition, the AP and/or the STA must stop use of the frequency band if the licensed user uses the frequency band used for transmission and/or reception of a current frame.

Accordingly, the AP and/or the STA should perform a procedure of determining whether a specific frequency band in a WS band is available, that is, whether a licensed user uses the frequency band. Determining whether a licensed user uses a specific frequency band is referred to as spectrum sensing. As a spectrum sensing mechanism, an energy detection method, a signature detection method, etc. may be used. It may be determined that the licensed user uses the frequency band if received signal strength is equal to or greater than a predetermined value or if a DTV preamble is detected.

In addition, as next-generation communication technology, machine-to-machine (M2M) communication technology is being discussed. Even in an IEEE 802.11 WLAN system, a technical standard supporting M2M communication has been developed as IEEE 802.11ah. M2M communication means a communication scheme including one or more machines and may be referred to as machine type communication (MTC). Here, a machine means an entity which does not require direct operation or intervention of a person. For example, a device including a mobile communication module, such as a meter or a vending machine, may include a user equipment such as a smart phone which is capable of automatically accessing a network without operation/intervention of a user to perform communication. M2M communication includes communication between devices (e.g., device-to-device (D2D) communication) and communication between a device and an application server. Examples of communication between a device and a server include communication between a vending machine and a server, communication between a point of sale (POS) device and a server and communication between an electric meter, a gas meter or a water meter and a server. An M2M communication based application may include security, transportation, health care, etc. If the characteristics of such examples are considered, in general, M2M communication should support transmission and reception of a small amount of data at a low rate in an environment in which very many apparatuses are present.

More specifically, M2M communication should support a larger number of STAs. In a currently defined WLAN system, it is assumed that a maximum of 2007 STAs is associated with one AP. However, in M2M communication, methods supporting the case in which a larger number of STAs (about 6000) are associated with one AP are being discussed. In addition, in M2M communication, it is estimated that there are many applications supporting/requiring a low transfer rate. In order to appropriately support the low transfer rate, for example, in a WLAN system, the STA may recognize presence of data to be transmitted thereto based on a traffic indication map (TIM) element and methods of reducing a bitmap size of the TIM are being discussed. In addition, in M2M communication, it is estimated that there is traffic having a very long transmission/reception interval. For example, in electricity/gas/water consumption, a very small amount of data is required to be exchanged at a long period (e.g., one month). In a WLAN system, although the number of STAs associated with one AP is increased, methods of efficiently supporting the case in which the number of STAs, in which a data frame to be received from the AP is present during one beacon period, is very small are being discussed.

WLAN technology has rapidly evolved. In addition to the above-described examples, technology for direct link setup, improvement of media streaming performance, support of fast and/or large-scale initial session setup, support of extended bandwidth and operating frequency, etc. is being developed.

2.2 Medium Access Mechanism

In a WLAN system according to IEEE 802.11, the basic access mechanism of medium access control (MAC) is a carrier sense multiple access with collision avoidance (CSMA/CA) mechanism. The CSMA/CA mechanism is also referred to as a distributed coordination function (DCF) of IEEE 802.11 MAC and employs a "listen before talk" access mechanism. According to such an access mechanism, the AP and/or the STA may perform clear channel assessment (CCA) for sensing a radio channel or medium during a predetermined time interval (for example, a DCF interframe space (DIFS)) before starting transmission. If it is determined that the medium is in an idle state as the sensed result, frame transmission starts via the medium. If it is determined that the medium is in an occupied state, the AP and/or the STA may set and wait for a delay period (e.g., a random backoff period) for medium access without starting transmission and then attempt to perform frame transmission. Since several STAs attempt to perform frame transmission after waiting for different times by applying the random backoff period, it is possible to minimize collision.

In addition, the IEEE 802.11 MAC protocol provides a hybrid coordination function (HCF). The HCF is based on the DCF and a point coordination function (PCF). The PCF refers to a periodic polling method for enabling all reception AP and/or STAs to receive data frames using a polling based synchronous access method. In addition, the HCF has enhanced distributed channel access (EDCA) and HCF controlled channel access (HCCA). The EDCA uses a contention access method for providing data frames to a plurality of users by a provider and the HCCA uses a contention-free channel access method using a polling mechanism. In addition, the HCF includes a medium access mechanism for improving quality of service (QoS) of a WLAN and may transmit QoS data both in a contention period (CP) and a contention free period (CFP).

Figure 6:
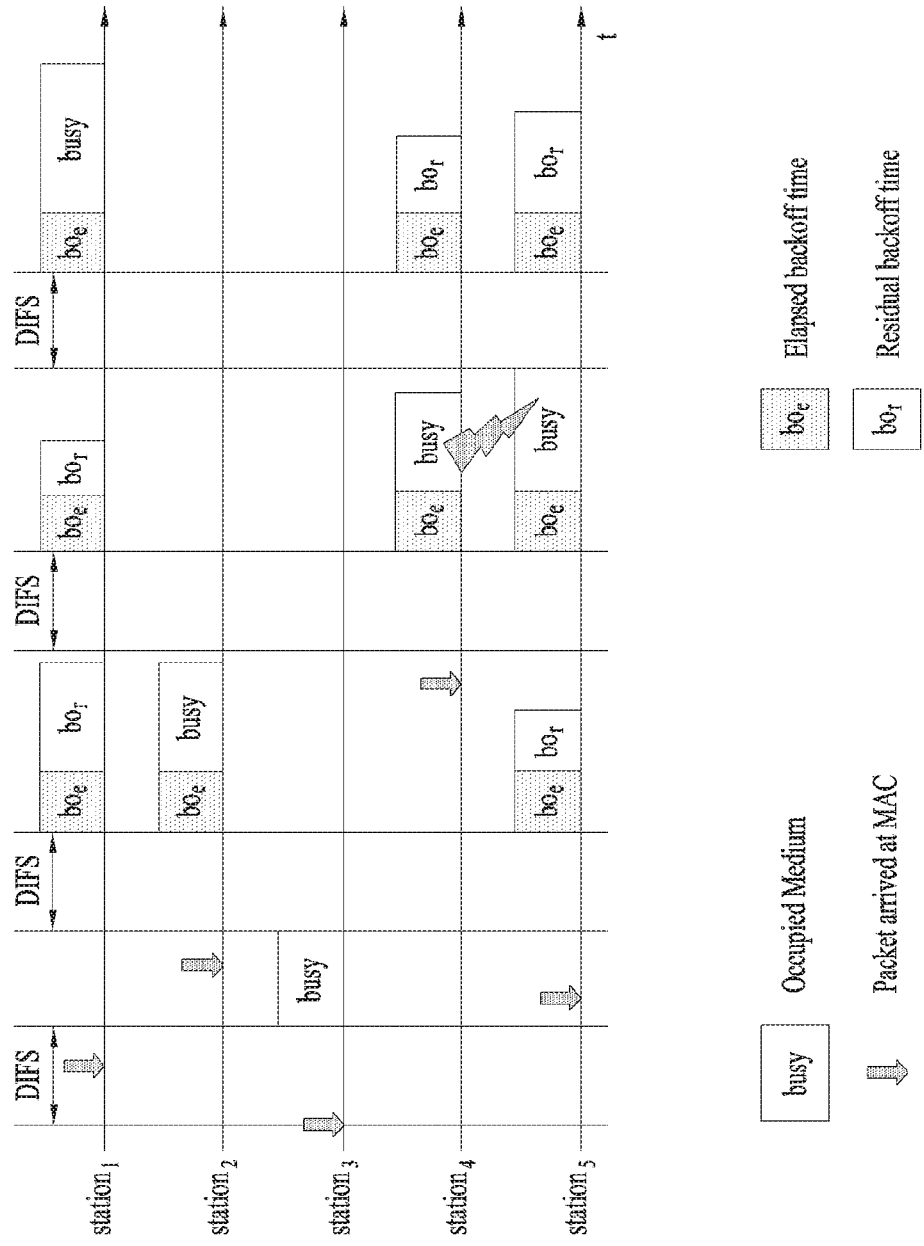
FIG. 6 is a diagram illustrating a backoff process.

FIG. 6 is a diagram illustrating a backoff process.

Operation based on a random backoff period will be described with reference to FIG. 6. If a medium is changed from an occupied or busy state to an idle state, several STAs may attempt data (or frame) transmission. At this time, a method of minimizing collision, the STAs may select respective random backoff counts, wait for slot times corresponding to the random backoff counts and attempt transmission. The random backoff count has a pseudo-random integer and may be set to one of values of 0 to CW. Here, the CW is a contention window parameter value. The CW parameter is set to CWmin as an initial value but may be set to twice CWmin if transmission fails (e.g., ACK for the transmission frame is not received). If the CW parameter value becomes CWmax, data transmission may be attempted while maintaining the CWmax value until data transmission is successful. If data transmission is successful, the CW parameter value is reset to CWmin CW, CWmin and CWmax values are preferably set to 2n−1 (n=0, 1, 2, . . . ).

If the random backoff process starts, the STA continuously monitors the medium while the backoff slots are counted down according to the set backoff count value. If the medium is in the occupied state, countdown is stopped and, if the medium is in the idle state, countdown is resumed.

In the example of FIG. 6, if packets to be transmitted to the MAC of STA3 arrive, STA3 may confirm that the medium is in the idle state during the DIFS and immediately transmit a frame. Meanwhile, the remaining STAs monitor that the medium is in the busy state and wait. During a wait time, data to be transmitted may be generated in STA1, STA2 and STA5. The STAs may wait for the DIFS if the medium is in the idle state and then count down the backoff slots according to the respectively selected random backoff count values.

In the example of FIG. 6, STA2 selects a smallest backoff count value and STA1 selects a largest backoff count value. That is, the residual backoff time of STA5 is less than the residual backoff time of STA1 when STA2 completes backoff count and starts frame transmission. STA1 and STA5 stop countdown and wait while STA2 occupies the medium. If occupancy of the medium by STA2 ends and the medium enters the idle state again, STA1 and STA5 wait for the DIFS and then resume countdown. That is, after the residual backoff slots corresponding to the residual backoff time are counted down, frame transmission may start. Since the residual backoff time of STA5 is less than of STA1, STA5 starts frame transmission.

If STA2 occupies the medium, data to be transmitted may be generated in the STA4. At this time, STA4 may wait for the DIFS if the medium enters the idle state, perform countdown according to a random backoff count value selected thereby, and start frame transmission. In the example of FIG. 6, the residual backoff time of STA5 accidentally matches the random backoff time of STA4. In this case, collision may occur between STA4 and STA5. If collision occurs, both STA4 and STA5 do not receive ACK and data transmission fails. In this case, STA4 and STA5 may double the CW value, select the respective random backoff count values and then perform countdown. STA1 may wait while the medium is busy due to transmission of STA4 and STA5, wait for the DIFS if the medium enters the idle state, and start frame transmission if the residual backoff time has elapsed.

2.3 Sensing Operation of STA

As described above, the CSMA/CA mechanism includes not only physical carrier sensing for directly sensing a medium by an AP and/or an STA but also virtual carrier sensing. Virtual carrier sensing solves a problem which may occur in medium access, such as a hidden node problem. For virtual carrier sensing, MAC of a WLAN may use a network allocation vector (NAV). The NAV refers to a value of a time until a medium becomes available, which is indicated to another AP and/or STA by an AP and/or an STA, which is currently utilizing the medium or has rights to utilize the medium. Accordingly, the NAV value corresponds to a period of time when the medium will be used by the AP and/or the STA for transmitting the frame, and medium access of the STA which receives the NAV value is prohibited during that period of time. The NAV may be set according to the value of the "duration" field of a MAC header of a frame.

A robust collision detection mechanism for reducing collision has been introduced, which will be described with reference to FIGS. 7 and 8. Although a transmission range may not be equal to an actual carrier sensing range, for convenience, assume that the transmission range may be equal to the actual carrier sensing range.

Figure 7:
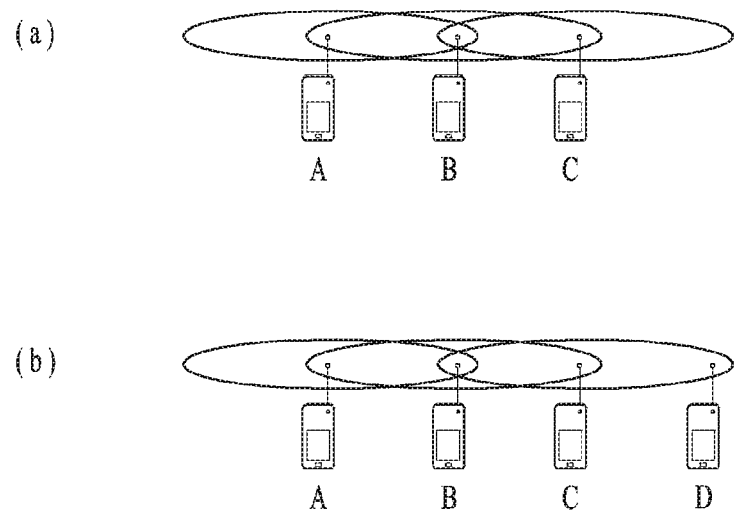
FIG. 7 is a diagram illustrating a hidden node and an exposed node.

FIG. 7 is a diagram illustrating a hidden node and an exposed node.

FIG. 7(a) shows a hidden node, and, in this case, an STA A and an STA B are performing communication and an STA C has information to be transmitted. More specifically, although the STA A transmits information to the STA B, the STA C may determine that the medium is in the idle state, when carrier sensing is performed before transmitting data to the STA B. This is because the STA C may not sense transmission of the STA A (that is, the medium is busy). In this case, since the STA B simultaneously receives information of the STA A and the STA C, collision occurs. At this time, the STA A may be the hidden node of the STA C.

FIG. 7(b) shows an exposed node and, in this case, the STA B transmits data to the STA A and the STA C has information to be transmitted to the STA D. In this case, if the STA C performs carrier sensing, it may be determined that the medium is busy due to transmission of the STA B. If the STA C has information to be transmitted to the STA D, since it is sensed that the medium is busy, the STA C waits until the medium enters the idle state. However, since the STA A is actually outside the transmission range of the STA C, transmission from the STA C and transmission from the STA B may not collide from the viewpoint of the STA A. Therefore, the STA C unnecessarily waits until transmission of the STA B is stopped. At this time, the STA C may be the exposed node of the STA B.

Figure 8:
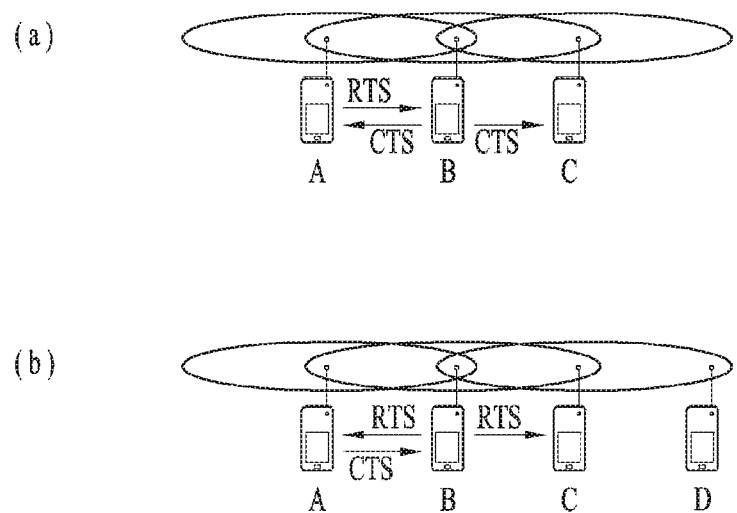
FIG. 8 is a diagram illustrating request to send (RTS) and clear to send (CTS).

FIG. 8 is a diagram illustrating request to send (RTS) and clear to send (CTS).

In the example of FIG. 7, in order to efficiently use a collision avoidance mechanism, short signaling packet such as RTS and CTS may be used. RST/CTS between two STAs may be enabled to be overheard by peripheral STAs such that the peripheral STAs confirm information transmission between the two STAs. For example, if a transmission STA transmits an RTS frame to a reception STA, the reception STA transmits a CTS frame to peripheral UEs to inform the peripheral UEs that the reception STA receives data.

FIG. 8(a) shows a method of solving a hidden node problem. Assume that both the STA A and the STA C attempt to transmit data to the STA B. If the STA A transmits the RTS to the STA B, the STA B transmits the CTS to the peripheral STA A and C. As a result, the STA C waits until data transmission of the STA A and the STA B is finished, thereby avoiding collision.

FIG. 8(b) shows a method of solving an exposed node problem. The STA C may overhear RTS/CTS transmission between the STA A and the STA B and determine that collision does not occur even when the STA C transmits data to another STA (e.g., the STA D). That is, the STA B transmits the RTS to all peripheral UEs and transmits the CTS only to the STA A having data to be actually transmitted. Since the STA C receives the RTS but does not receive the CTS of the STA A, it can be confirmed that the STA A is outside carrier sensing of the STA C.

2.4 Power Management

As described above, in a WLAN system, channel sensing should be performed before an STA performs transmission and reception. When the channel is always sensed, continuous power consumption of the STA is caused. Power consumption in a reception state is not substantially different from power consumption in a transmission state and continuously maintaining the reception state imposes a burden on an STA with limited power (that is, operated by a battery). Accordingly, if a reception standby state is maintained such that the STA continuously senses the channel, power is inefficiently consumed without any special advantage in terms of WLAN throughput. In order to solve such a problem, in a WLAN system, a power management (PM) mode of the STA is supported.

The PM mode of the STA is divided into an active mode and a power save (PS) mode. The STA fundamentally operates in an active mode. The STA which operates in the active mode is maintained in an awake state. The awake state refers to a state in which normal operation such as frame transmission and reception or channel scanning is possible. The STA which operates in the PS mode operates while switching between a sleep state or an awake state. The STA which operates in the sleep state operates with minimum power and does not perform frame transmission and reception or channel scanning.

Since power consumption is reduced as the sleep state of the STA is increased, the operation period of the STA is increased. However, since frame transmission and reception is impossible in the sleep state, the STA may not unconditionally operate in the sleep state. If a frame to be transmitted from the STA, which operates in the sleep state, to the AP is present, the STA may be switched to the awake state to transmit the frame. If a frame to be transmitted from the AP to the STA is present, the STA in the sleep state may not receive the frame and may not confirm that the frame to be received is present. Accordingly, the STA needs to perform an operation for switching to the awake state according to a specific period in order to confirm presence of the frame to be transmitted thereto (to receive the frame if the frame to be transmitted is present).

Figure 9:
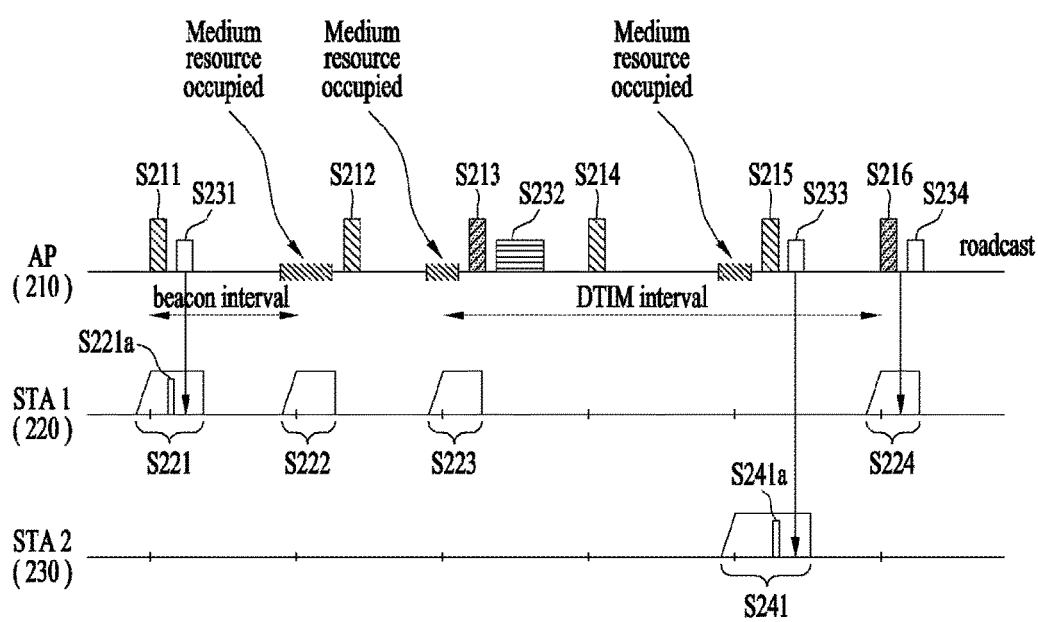
FIG. 9 is a diagram illustrating power management operation.

FIG. 9 is a diagram illustrating power management operation.

Referring to FIG. 9, an AP 210 transmits beacon frames to STAs within a BSS at a predetermined period (S211, S212, S213, S214, S215 and S216). The beacon frame includes a traffic indication map (TIM) information element. The TIM information element includes information indicating that buffered traffic for STAs associated with the AP 210 is present and the AP 210 will transmit a frame. The TIM element includes a TIM used to indicate a unicast frame or a delivery traffic indication map (DTIM) used to indicate a multicast or broadcast frame.

The AP 210 may transmit the DTIM once whenever the beacon frame is transmitted three times. An STA1 220 and an STA2 222 operate in the PS mode. The STA1 220 and the STA2 222 may be switched from the sleep state to the awake state at a predetermined wakeup interval to receive a TIM element transmitted by the AP 210. Each STA may compute a time to switch to the awake state based on a local clock thereof. In the example of FIG. 9, assume that the clock of the STA matches the clock of the AP.

For example, the predetermined awake interval may be set such that the STA1 220 is switched to the awake state every beacon interval to receive a TIM element. Accordingly, the STA1 220 may be switched to the awake state (S211) when the AP 210 first transmits the beacon frame (S211). The STA1 220 may receive the beacon frame and acquire the TIM element. If the acquired TIM element indicates that a frame to be transmitted to the STA1 220 is present, the STA1 220 may transmit, to the AP 210, a power save-Poll (PS-Poll) frame for requesting frame transmission from the AP 210 (S221a). The AP 210 may transmit the frame to the STA1 220 in correspondence with the PS-Poll frame (S231). The STA1 220 which completes frame reception is switched to the sleep state.

When the AP 210 secondly transmits the beacon frame, since another device access the medium and thus the medium is busy, the AP 210 may not transmit the beacon frame at an accurate beacon interval and may transmit the beacon frame at a delayed time (S212). In this case, the operation mode of the STA1 220 is switched to the awake state according to the beacon interval but the delayed beacon frame is not received. Therefore, the operation mode of the STA1 220 is switched to the sleep state again (S222).

When the AP 210 thirdly transmits the beacon frame, the beacon frame may include a TIM element set to a DTIM. Since the medium is busy, the AP 210 transmits the beacon frame at a delayed time (S213). The STA1 220 is switched to the awake state according to the beacon interval and may acquire the DTIM via the beacon frame transmitted by the AP 210. Assume that the DTIM acquired by the STA1 220 indicates that a frame to be transmitted to the STA1 220 is not present and a frame for another STA is present. In this case, the STA1 220 may confirm that a frame transmitted thereby is not present and may be switched to the sleep state again. The AP 210 transmits the beacon frame and then transmits the frame to the STA (S232).

The AP 210 fourthly transmits the beacon frame (S214). Since the STA1 220 cannot acquire information indicating that buffered traffic therefor is present via reception of the TIM element twice, the wakeup interval for receiving the TIM element may be controlled. Alternatively, if signaling information for controlling the wakeup interval of the STA1 220 is included in the beacon frame transmitted by the AP 210, the wakeup interval value of the STA1 220 may be controlled. In the present example, the STA1 220 may change switching of the operation state for receiving the TIM element every beacon interval to switching of the operation state every three beacon intervals. Accordingly, since the STA1 220 is maintained in the sleep state when the AP 210 transmits the fourth beacon frame (S214) and transmits the fifth beacon frame (S215), the TIM element cannot be acquired.

When the AP 210 sixthly transmits the beacon frame (S216), the STA1 220 may be switched to the awake state to acquire the TIM element included in the beacon frame (S224). Since the TIM element is a DTIM indicating that a broadcast frame is present, the STA1 220 may not transmit the PS-Poll frame to the AP 210 but may receive a broadcast frame transmitted by the AP 210 (S234). The wakeup interval set in the STA2 230 may be set to be greater than that of the STA1 220. Accordingly, the STA2 230 may be switched to the awake state to receive the TIM element (S241), when the AP 210 fifthly transmits the beacon frame (S215). The STA2 230 may confirm that a frame to be transmitted thereto is present via the TIM element and transmits the PS-Poll frame to the AP 210 (S241a) in order to request frame transmission. The AP 210 may transmit the frame to the STA2 230 in correspondence with the PS-Poll frame (S233).

For PM management shown in FIG. 9, a TIM element includes a TIM indicating whether a frame to be transmitted to an STA is present and a DTIM indicating whether a broadcast/multicast frame is present. The DTIM may be implemented by setting a field of the TIM element.

Figure 10:
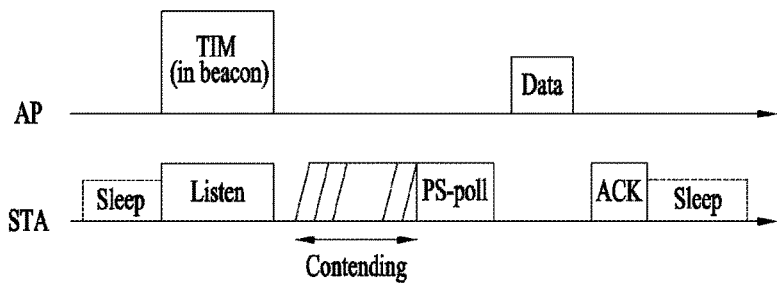
FIGS. 10 to 12 are diagrams illustrating operation of a station (STA) which receives a traffic indication map (TIM).
Figure 11:
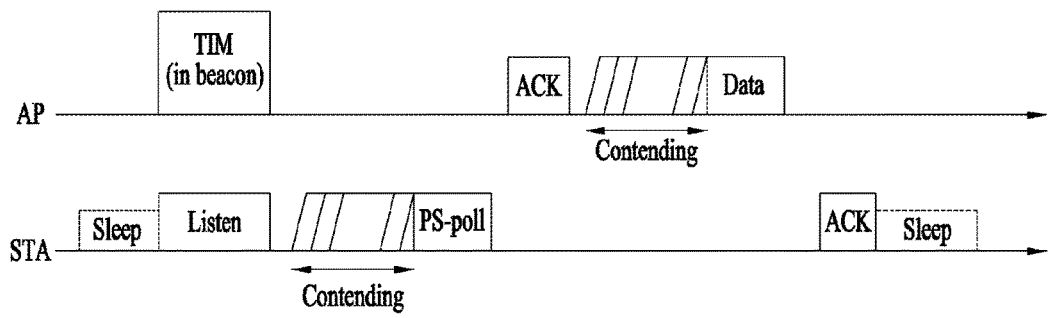
Figure 12:
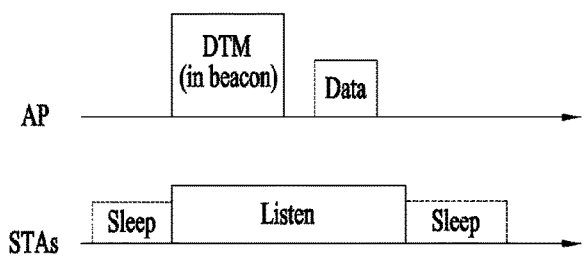

FIGS. 10 to 12 are diagrams illustrating operation of a station (STA) which receives a traffic indication map (TIM).

Referring to FIG. 10, an STA may be switched from a sleep state to an awake state in order to receive a beacon frame including a TIM from an AP and interpret the received TIM element to confirm that buffered traffic to be transmitted thereto is present. The STA may contend with other STAs for medium access for transmitting a PS-Poll frame and then transmit the PS-Poll frame in order to request data frame transmission from the AP. The AP which receives the PS-Poll frame transmitted by the STA may transmit the frame to the STA. The STA may receive the data frame and transmit an ACK frame to the AP. Thereafter, the STA may be switched to the sleep state again.

As shown in FIG. 10, the AP may receive the PS-Poll frame from the STA and then operate according to an immediate response method for transmitting a data frame after a predetermined time (e.g., a short inter-frame space (SIFS)). If the AP does not prepare a data frame to be transmitted to the STA during the SIFS after receiving the PS-Poll frame, the AP may operate according to a deferred response method, which will be described with reference to FIG. 11.

In the example of FIG. 11, operation for switching the STA from the sleep state to the awake state, receiving a TIM from the AP, contending and transmitting a PS-Poll frame to the AP is equal to that of FIG. 10. If the data frame is not prepared during the SIFS even when the AP receives the PS-Poll frame, the data frame is not transmitted but an ACK frame may be transmitted to the STA. If the data frame is prepared after transmitting the ACK frame, the AP may contend and transmit the data frame to the STA. The STA may transmit the ACK frame indicating that the data frame has been successfully received to the AP and may be switched to the sleep state.

FIG. 12 shows an example in which the AP transmits the DTIM. The STAs may be switched from the sleep state to the awake state in order to receive the beacon frame including the DTIM element from the AP. The STA may confirm that a multicast/broadcast frame will be transmitted via the received DTIM. The AP may immediately transmit data (that is, a multicast/broadcast frame) without PS-Poll frame transmission and reception after transmitting the beacon frame including the DTIM. The STAs may receive data in the awake state after receiving the beacon frame including the DTIM and may be switched to the sleep state again after completing data reception.

2.5 TIM Structure

In the PM mode management method based on the TIM (or DTIM) protocol described with reference to FIGS. 9 to 12, the STAs may confirm whether a data frame to be transmitted thereto is present via STA identification included in the TIM element. The STA identification may be related to an association identifier (AID) assigned to the STA upon association with the AP.

The AID is used as a unique identifier for each STA within one BSS. For example, in a current WLAN system, the AID may be one of values of 1 to 2007. In a currently defined WLAN system, 14 bits are assigned to the AID in a frame transmitted by the AP and/or the STA. Although up to 16383 may be assigned as the AID value, 2008 to 16383 may be reserved.

The TIM element according to an existing definition is not appropriately applied to an M2M application in which a large number (e.g., more than 2007) of STAs is associated with one AP. If the existing TIM structure extends without change, the size of the TIM bitmap is too large to be supported in an existing frame format and to be suitable for M2M communication considering an application with a low transfer rate. In addition, in M2M communication, it is predicted that the number of STAs, in which a reception data frame is present during one beacon period, is very small. Accordingly, in M2M communication, since the size of the TIM bitmap is increased but most bits have a value of 0, there is a need for technology for efficiently compressing the bitmap.

As an existing bitmap compression technology, a method of omitting 0 which continuously appears at a front part of a bitmap and defining an offset (or a start point) is provided. However, if the number of STAs in which a buffered frame is present is small but a difference between the AID values of the STAs is large, compression efficiency is bad. For example, if only frames to be transmitted to only two STAs respectively having AID values of 10 and 2000 are buffered, the length of the compressed bitmap is 1990 but all bits other than both ends have a value of 0. If the number of STAs which may be associated with one AP is small, bitmap compression inefficiency is not problematic but, if the number of STAs is increased, bitmap compression inefficiency deteriorates overall system performance.

As a method of solving this problem, AIDs may be divided into several groups to more efficiently perform data transmission. A specific group ID (GID) is assigned to each group. AIDs assigned based on the group will be described with reference to FIG. 13.

Figure 13:
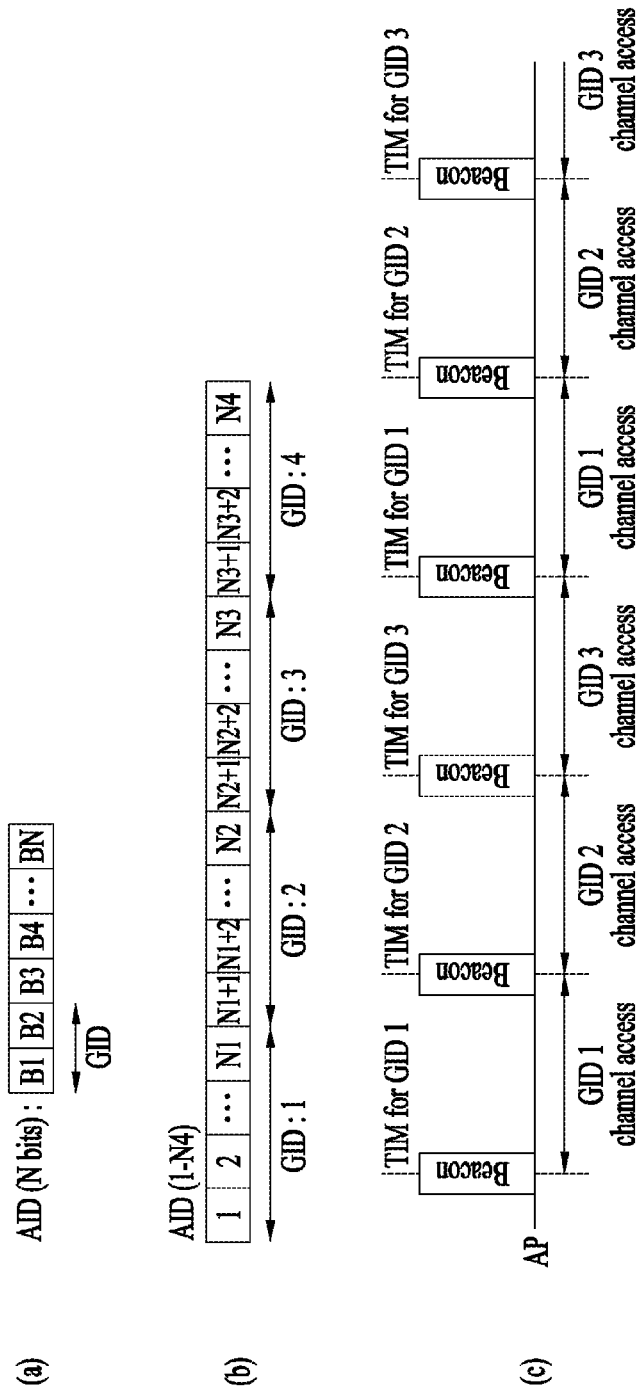
FIG. 13 is a diagram illustrating a group based association identifier (AID).

FIG. 13(*a*) shows an example of AIDs assigned based on a group. In the example of FIG. 13(*a*), several bits of a front part of the AID bitmap may be used to indicate the GID. For example, four DIDs may be expressed by the first two bits of the AID of the AID bitmap. If the total length of the AID bitmap is N bits, the first two bits (B1 and B2) indicate the GID of the AID.

FIG. 13(*a*) shows another example of AIDs assigned based on a group. In the example of FIG. 13(*b*), the GID may be assigned according to the location of the AID. At this time, the AIDs using the same GID may be expressed by an offset and a length value. For example, if GID 1 is expressed by an offset A and a length B, this means that AIDs of A to A+B−1 on the bitmap have GID 1. For example, in the example of FIG. 13(*b*), assume that all AIDs of 1 to N4 are divided into four groups. In this case, AIDs belonging to GID 1 are 1 to N1 and may be expressed by an offset 1 and a length N1. AIDs belonging to GID2 may be expressed by an offset N1+1 and a length N2−N1+1, AIDs belonging to GID 3 may be expressed by an offset N2+1 and a length N3−N2+1, and AIDs belonging to GID 4 may be expressed by an offset N3+1 and a length N4−N3+1.

If the AIDs assigned based on the group are introduced, channel access is allowed at a time interval which is changed according to the GID to solve lack of TIM elements for a large number of STAs and to efficiently perform data transmission and reception. For example, only channel access of STA(s) corresponding to a specific group may be granted during a specific time interval and channel access of the remaining STA(s) may be restricted. A predetermined time interval at which only access of specific STA(s) is granted may also be referred to as a restricted access window (RAW).

Channel access according to GID will be described with reference to FIG. 13(*c*). FIG. 13(*c*) shows a channel access mechanism according to a beacon interval if the AIDs are divided into three groups. At a first beacon interval (or a first RAW), channel access of STAs belonging to GID 1 is granted but channel access of STAs belonging to other GIDs is not granted. For such implementation, the first beacon includes a TIM element for AIDs corresponding to GID 1. A second beacon frame includes a TIM element for AIDs corresponding to GID 2 and thus only channel access of the STAs corresponding to the AIDs belonging to GID 2 is granted during the second beacon interval (or the second RAW). A third beacon frame includes a TIM element for AIDs corresponding to GID 3 and thus only channel access of the STAs corresponding to the AIDs belonging to GID 3 is granted during the third beacon interval (or the third RAW). A fourth beacon frame includes a TIM element for AIDs corresponding to GID 1 and thus only channel access of the STAs corresponding to the AIDs belonging to GID 1 is granted during the fourth beacon interval (or the fourth RAW). Only channel access of the STAs corresponding to a specific group indicated by the TIM included in the beacon frame may be granted even in fifth and subsequent beacon intervals (or fifth and subsequent RAWs).

Although the order of GIDs allowed according to the beacon interval is cyclic or periodic in FIG. 13(*c*), the present invention is not limited thereto. That is, by including only AID(s) belonging to specific GID(s) in the TIM elements, only channel access of STA(s) corresponding to the specific AID(s) may be granted during a specific time interval (e.g., a specific RAW) and channel access of the remaining STA(s) may not be granted.

The above-described group based AID assignment method may also be referred to as a hierarchical structure of a TIM. That is, an entire AID space may be divided into a plurality of blocks and only channel access of STA(s) corresponding to a specific block having a non-zero value (that is, STAs of a specific group) may be granted. A TIM having a large size is divided into small blocks/groups such that the STA easily maintains TIM information and easily manages blocks/groups according to class, QoS or usage of the STA. Although a 2-level layer is shown in the example of FIG. 13, a TIM of a hierarchical structure having two or more levels may be constructed. For example, the entire AID space may be divided into a plurality of page groups, each page group may be divided into a plurality of blocks, and each block may be divided into a plurality of sub-blocks. In this case, as an extension of the example of FIG. 13(*a*), the first N1 bits of the AID bitmap indicate a paging ID (that is, a PID), the next N2 bits indicate a block ID, the next N3 bits indicate a sub-block ID, and the remaining bits indicate the STA bit location in the sub-block.

In the following examples of the present invention, various methods of dividing and managing STAs (or AIDs assigned to the STAs) on a predetermined hierarchical group basis are applied and the group based AID assignment method is not limited to the above examples.

2.6 Improved Channel Access Method

If AIDs are assigned/managed based on a group, STAs belonging to a specific group may use a channel only at a "group channel access interval (or RAW)" assigned to the group. If an STA supports an M2M application, traffic for the STA may have a property which may be generated at a long period (e.g., several tens of minutes or several hours). Since such an STA does not need to be in the awake state frequently, the STA may be in the sleep mode for g a long period of time and be occasionally switched to the awake state (that is, the awake interval of the STA may be set to be long). An STA having a long wakeup interval may be referred to as an STA which operates in a "long-sleeper" or "long-sleep" mode. The case in which the wakeup interval is set to be long is not limited to M2M communication and the wakeup interval may be set to be long according to the state of the STA or surroundings of the STA even in normal WLAN operation.

If the wakeup interval is set, the STA may determine whether a local clock thereof exceeds the wakeup interval. However, since the local clock of the STA generally uses a cheap oscillator, an error probability is high. In addition, if the STA operates in long-sleep mode, the error may be increased with time. Accordingly, time synchronization of the STA which occasionally wakes up may not match time synchronization of the AP. For example, although the STA computes when the STA may receive the beacon frame to be switched to the awake state, the STA may not actually receive the beacon frame from the AP at that timing. That is, due to clock drift, the STA may miss the beacon frame and such a problem may frequently occur if the STA operates in the long sleep mode.

Figure 14:
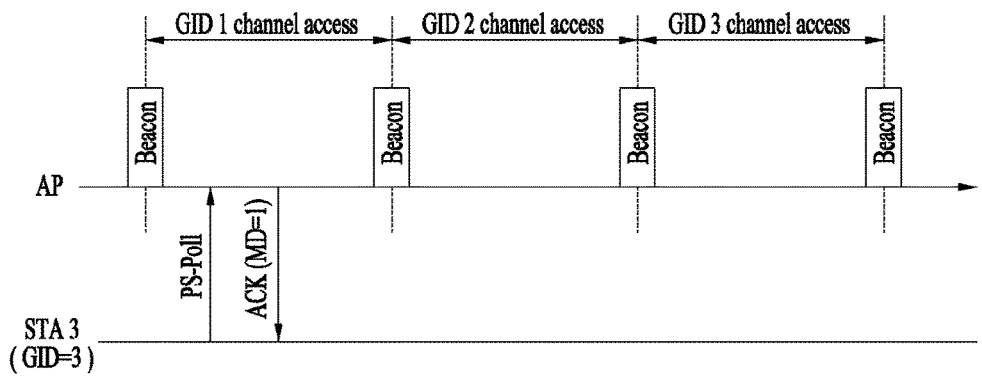
FIGS. 14 to 16 are diagrams showing examples of operation of an STA if a group channel access interval is set.
Figure 15:
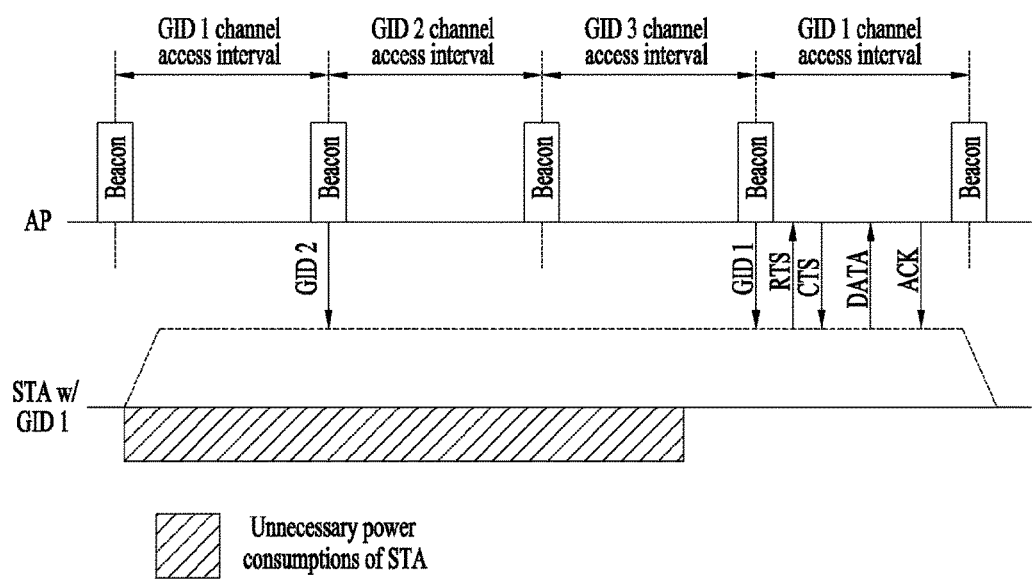
Figure 16:
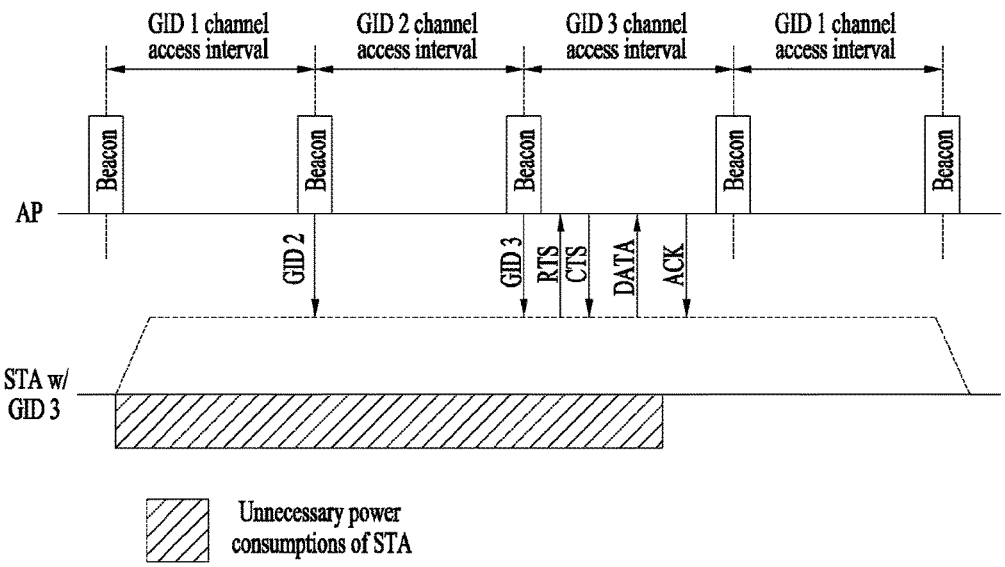

FIGS. 14 to 16 are diagrams showing examples of operation of an STA if a group channel access interval is set.

In the example of FIG. 14, STA3 may belong to group 3 (that is, GID=3), wake up at a channel access interval assigned to group 1 and perform PS-Poll for requesting frame transmission from the AP. The AP which receives PS-Poll from the STA transmits an ACK frame to STA3. If buffered data to be transmitted to STA3 is present, the AP may provide information indicating that data to be transmitted is present via the ACK frame. For example, the value of a "More Data" field (or an MD field) having a size of 1 bit included in the ACK frame may be set to 1 (that is, MD=1) to indicate the above information.

Since a time when STA3 transmits PS-Poll belongs to the channel access interval for group 1, even if data to be transmitted to STA3 is present, the AP does not immediately transmit data after transmitting the ACK frame but transmits data to STA3 at a channel access interval (GID 3 channel access of FIG. 14) assigned to group 3 to which STA3 belongs.

Since STA3 receives the ACK frame set to MD=1 from the AP, STA3 continuously waits for transmission of data from the AP. That is, in the example of FIG. 14, since STA3 cannot receive the beacon frame immediately after waking up, STA3 transmits PS-Poll to the AP on the assumption that a time when STA3 wakes up corresponds to the channel access interval assigned to the group, to which STA3 belongs, according to computation based on the local clock thereof and data to be transmitted thereto is present. Alternatively, since STA3 operates in the long-sleep mode, on the assumption that time synchronization is not performed, if the data to be transmitted thereto is present, STA3 may transmit PS-Poll to the AP in order to receive the data. Since the ACK frame received by STA3 from the AP indicates that data to be transmitted to STA3 is present, STA3 continuously waits for data reception under the assumption of the interval in which channel access thereof is granted. STA3 unnecessarily consumes power even when data reception is not allowed, until time synchronization is appropriately performed from information included in a next beacon frame.

In particular, if STA3 operates in the long-sleep mode, the beacon frame may frequently not be received, CCA may be performed even at the channel access interval, to which STA2 does not belong, thereby causing unnecessary power consumption.

Next, in the example of FIG. 15, the beacon frame is missed when the STA having GID 1 (that is, belonging to group 1) wakes up. That is, the STA which does not receive the beacon frame including the GID (or PID) assigned thereto is continuously in the awake state until the beacon frame including the GID (or PID) thereof is received. That is, although the STA wakes up at channel access interval assigned thereto, the STA cannot confirm whether the GID (or PID) thereof is included in the TIM transmitted via the beacon frame and thus cannot confirm whether the timing corresponds to the channel access interval assigned to the group thereof.

In the example of FIG. 15, the STA which is switched from the sleep state to the awake state is continuously in the awake state until the fourth beacon frame including the GID (that is, GID 1) thereof is received after the first beacon frame has been missed, thereby causing unnecessary power consumption. As a result, after unnecessary power consumption, the STA may receive the beacon frame including GID 1 and then may perform RTS transmission, CTS reception, data frame transmission and ACK reception.

FIG. 16 shows the case in which an STA wakes up at a channel access interval for another group. For example, the STA having GID 3 may wake up at the channel access interval for GID 1. That is, the STA having GID 3 unnecessarily consumes power until the beacon frame having the GID thereof is received after waking up. If a TIM indicating GID 3 is received via a third beacon frame, the STA may recognize the channel access interval for the group thereof and perform data transmission and ACK reception after CCA through RTS and CTS.

3. Pilot Sequence Transmission and Reception Methods

As interest in future Wi-Fi and demand for improvement of throughput and QoE (quality of experience) after 802.11ac increase, it is necessary to define a new frame format for future WLAN systems. The most important part in a new frame format is a preamble part because design of a preamble used for synchronization, channel tracking, channel estimation, adaptive gain control (AGC) and the like may directly affect system performance.

In the future Wi-Fi system in which a large number of APs and STAs simultaneously access and attempt data transmission and reception, system performance may be limited when legacy preamble design is employed. That is, if each preamble block (e.g., a short training field (STF) in charge of AGC, CFO estimation/compensation, timing control and the like or a long training field (LTF) in charge of channel estimation/compensation, residual CFO compensation and the like) executes only the function thereof defined in the legacy preamble structure, frame length increases, causing overhead. Accordingly, if a specific preamble block can support various functions in addition to the function designated therefor, an efficient frame structure can be designed.

Furthermore, since the future Wi-Fi system considers data transmission in outdoor environments as well as indoor environments, the preamble structure may need to be designed differently depending on environments. Although design of a unified preamble format independent of environment variation can aid in system implementation and operation, of course, it is desirable that preamble design be adapted to system environment.

Preamble design for efficiently supporting various functions is described hereinafter. For convenience, a new WLAN system is referred to as an HE (High Efficiency) system and a frame and a PPDU (PLCP (Physical Layer Convergence Procedure) Protocol Data Unit) of the HE system are respectively referred to as an HE frame and an HE PPDU. However, it is obvious to those skilled in the art that the proposed preamble is applicable to other WLAN systems and cellular systems in addition to the HE system.

The following table 1 shows OFDM numerology which is a premise of a pilot sequence transmission method described below. Table 1 shows an example of new OFDM numerology proposed in the HE system and numerals and items shown in Table 1 are merely examples and other values may be applied. Table 1 is based on the assumption that FFT having a size four times the legacy one is applied to a given BW and 3 DCs are used per BW.

TABLE 1

| Parameter | CBW20 | CBW40 | CBW80 | CBW80 + 80 | CBW160 | Description |
|---|---|---|---|---|---|---|
| $N_{FFT}$ | 256 | 512 | 1024 | 1024 | 2048 | FFT size |
| $N_{SD}$ | 238 | 492 | 1002 | 1002 | 2004 | Number of complex data numbers per frequency segment |
| $N_{SP}$ | 4 | 6 | 8 | 8 | 16 | Number of pilot values per frequency segment |
| $N_{ST}$ | 242 | 498 | 1010 | 1010 | 2020 | Total number of subcarriers per frequency segment. See NOTE. |
| $N_{SR}$ | 122 | 250 | 506 | 506 | 1018 | Highest data subcarrier index per frequency segment |
| $N_{Seg}$ | 1 | 1 | 1 | 2 | 1 | Number of frequency segments |
| $\Delta_F$ | | | 312.5 kHz | | | Subcarrier frequency Spacing for non-HE portion |
| $\Delta_{F\_HE}$ | | | 78.125 kHz | | | Subcarrier frequency Spacing for HE portion |
| $T_{DFT}$ | | | 3.2 μs | | | IDFT/DFT period for non-HE portion |
| $T_{DFT\_HE}$ | | | 12.8 μs | | | IDFT/DFT period for HE portion |
| $T_{GI}$ | | | 0.8 μs = $T_{DFT}/4$ | | | Guard interval duration for non-HE portion |
| $T_{GI\_HE}$ | | | 3.2 μs = $T_{DFT\_HE}/4$ | | | Guard interval duration for HE portion |
| $T_{GI2}$ | | | 1.6 μs | | | Double guard interval for non-HE portion |
| $T_{GIS\_HE}$ | | | 0.8 μs = $T_{DFT\_HE}/16$ [Alternative: 0.4 μs (1/32 CP)] | | | Short guard interval Duration (used only for HE data) |
| $T_{SYML}$ | | | 4 μs = $T_{DFT} + T_{GI}$ | | | Long GI symbol interval for non-HE portion |
| $T_{SYML\_HE}$ | | | 16 μs = $T_{DFT\_HE} + T_{GI\_HE}$ | | | Long GI symbol interval for HE portion |
| $T_{SYMS\_HE}$ | | | 13.6 μs = $T_{DFT\_HE} + T_{GIS\_HE}$ [Alternative: 13.2 μs (with 1/32 CP)] | | | Short GI symbol interval (used only for HE data) |
| $T_{SYM}$ | | | $T_{SYML}$ or $T_{SYMS}$ depending on the GI used | | | Symbol interval for non-HE portion |
| $T_{SYM\_HE}$ | | | $T_{SYML\_HE}$ or $T_{SYMS\_HE}$ depending on the GI used | | | Symbol interval for HE portion |

TABLE 1-continued

| Parameter | CBW20 | CBW40 | CBW80 | CBW80 + 80 | CBW160 | Description |
|---|---|---|---|---|---|---|
| $T_{L-STF}$ | | | $8 \mu s = 10 * T_{DFT}/4$ | | | Non-HE Short Training field duration |
| $T_{L-LTF}$ | | | $8 \mu s = 2 \times T_{DFT} + T_{GI2}$ | | | Non-HE Long Training field duration |
| $T_{L-SIG}$ | | | $4 \mu s = T_{SYML}$ | | | Non-HE SIGNAL field duration |
| $T_{HE-SIGA}$ | | | $12.8 \mu s = 2(T_{SYML} + 3T_{GI})$ in HE-PPDU format-1 or $T_{SYML\_HE}$ in HE-PPDU format-2 and HE-PPDU format-3 | | | HE Signal A field duration |
| $T_{HE-STF}$ | | | $T_{SYML\_HE}$ | | | HE Short Training field duration |
| $T_{HE-LTF}$ | | | $T_{SYML\_HE}$ | | | Duration of each HE LTF symbol |
| $T_{HE-SIGB}$ | | | $T_{SYML\_HE}$ | | | HE Signal B field duration |
| $N_{service}$ | | | 16 | | | Number of bits in the SERVICE field |
| $N_{tail}$ | | | 6 | | | Number of tail bits per BCC encoder |

NOTE
$N_{ST} = N_{SD} + N_{SP}$

Figure 17:
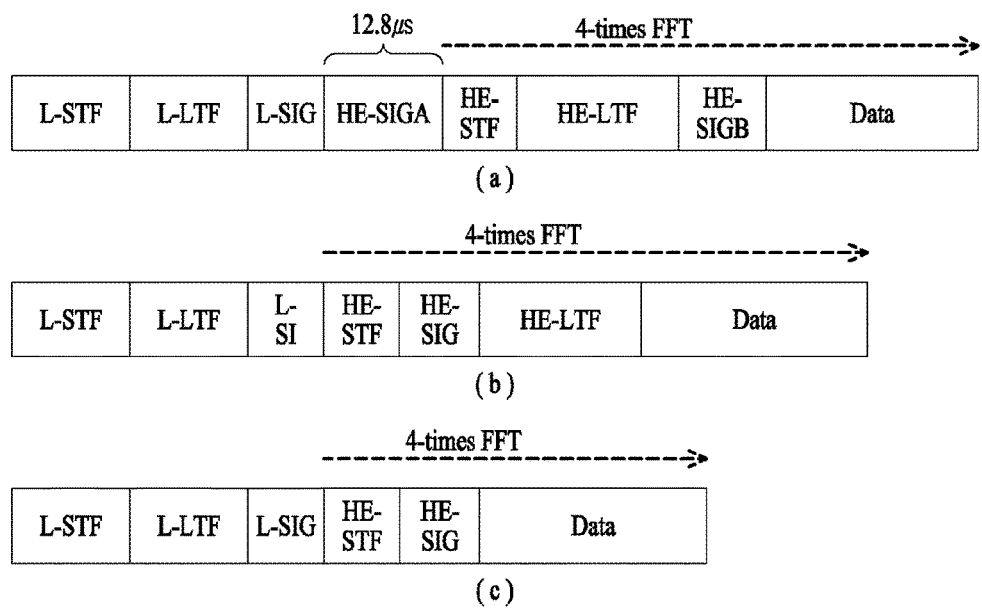
FIG. 17 is a diagram illustrating a frame structure according to an embodiment.

FIG. 17 is a diagram illustrating frame structures related to an embodiment of the present invention. As illustrated in FIGS. 17(a), 17(b) and 17(c), various frame structures can be configured, and a proposed pilot sequence transmission method is related to an HE-STF (High Efficiency Short Training Field) in a preamble in a frame structure.

Figure 18:
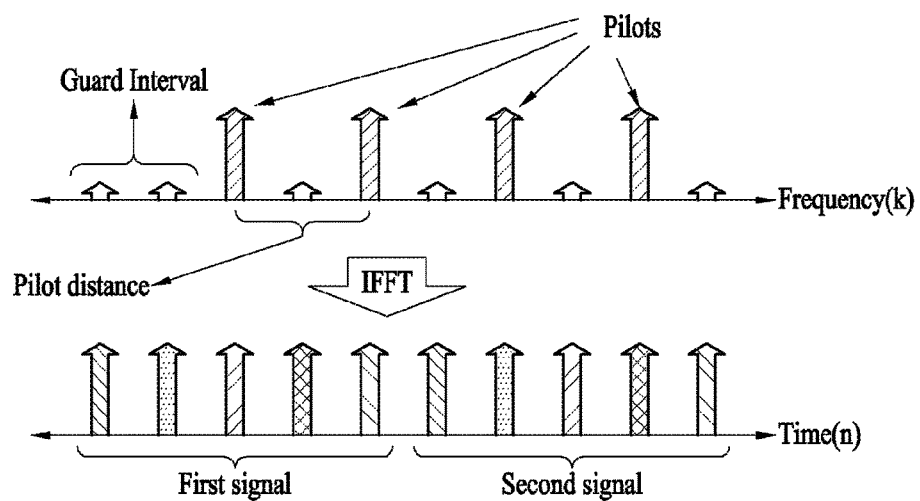
FIG. 18 is a diagram illustrating the basic concept of a pilot sequence.

FIG. 18 is a diagram illustrating a pilot sequence related to an embodiment of the present invention. The HE-STF illustrated in FIG. 17 is a part of a preamble and carries pilot signals for channel estimation, CFO (Carrier Frequency Offset) estimation, symbol timing estimation and the like. Sequentially transmitted pilot signals are called a pilot sequence. FIG. 18 illustrates general design of a pilot sequence in the HE-STF. In FIG. 18, the upper graph shows a pilot sequence in the frequency domain and the lower graph shows a pilot sequence in the time domain.

The pilot sequence in the frequency domain is defined by a guard interval, a pilot distance and a pilot signal magnitude. In the example shown in FIG. 18, small arrows in the pilot sequence in the frequency domain indicate pilot signals having a magnitude of 0 and a distance between neighboring pilot signals is 2 (i.e., pilot distance=2). When the guard interval is a multiple of the pilot distance (a multiple of 2), if pilot signals in the frequency domain are transformed into the time domain, pilot signals in the time domain have a repeated pattern as shown in the lower part of FIG. 18. When signals in a first period are referred to as first signals and signals in a second period are referred to as second signals, the first signals and the second signals have the same pattern.

If the pilot distance of the pilot signals in the frequency domain is 4 and the guard interval is a multiple of 4, the pilot signals in the time domain are defined as 4 repeated patterns and first/second/third/fourth signals have the same pattern. Such definition of signals in a repeated pattern in the time domain is meaningful because it enables accurate symbol timing and CFO estimation without channel information.

A description will be given of a method of changing (shifting) the position of a pilot sequence and transmitting the pilot sequence to a receiver and a method of identifying a received pilot sequence by the receiver on the basis of the frame structure, described with reference to FIG. 17, with reference to FIGS. 19 to 27.

3.1 Shifting Pilot Sequence Generation Method 1

FIGS. 19 to 27 are diagrams illustrating shifting pilot sequences according to proposed embodiments. A description will be given of a method of shifting a pilot sequence in the frequency domain in embodiment 1.

When pilot sequences in the frequency domain are arranged at a regular interval, all pilot signals included in a pilot sequence are circularly shifted within the range of the interval to generate a sequence set. A plurality of pilot sequences generated through circular shifting of a specific pilot sequence is called a sequence set, and a transmitter can select any pilot sequence from among the sequence set and transmit the selected pilot sequence.

Figure 19:
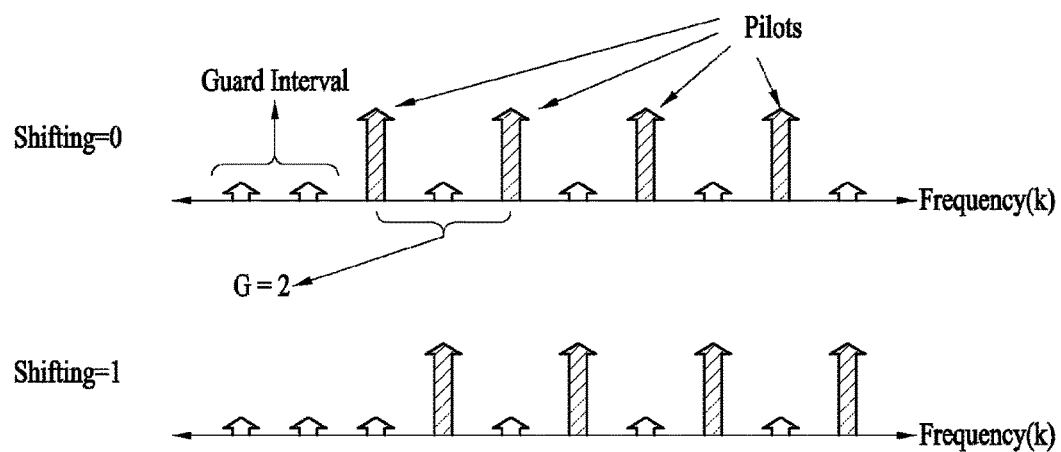
FIGS. 19 to 21 are diagrams illustrating pilot sequence shifting.

Referring to FIG. 19, a reference pilot sequence which has not been shifted is shown in the upper part. The reference pilot sequence has a guard interval of 2 and a pilot distance of 2. When the reference pilot sequence having a regular interval is circularly shifted by 1 in the frequency domain, a pilot sequence shown in the lower part of FIG. 19 is generated. A pilot sequence having a shifting value of 0 (shifting=0) and a pilot sequence having a shifting value of 1 (shifting=1) form a single sequence set, and the transmitter can select one pilot sequence from the sequence set and transmit the pilot sequence to a receiver.

The receiver can identify the received pilot sequence to discriminate the two different pilot sequences (shifting=0, shifting=1) from each other. As the receiver can discriminate the two pilot sequences, the transmitter can transmit additional information corresponding to 1 bit to the receiver. That is, when it is determined that a case of transmitting a pilot sequence of shifting=0 and a case of transmitting a pilot sequence of shifting=1 indicate different pieces of information between the transmitter and the receiver, the receiver can acquire the additional information corresponding to 1 bit depending on which pilot sequence in the sequence set is received. This additional information is called a "signature".

Figure 20:
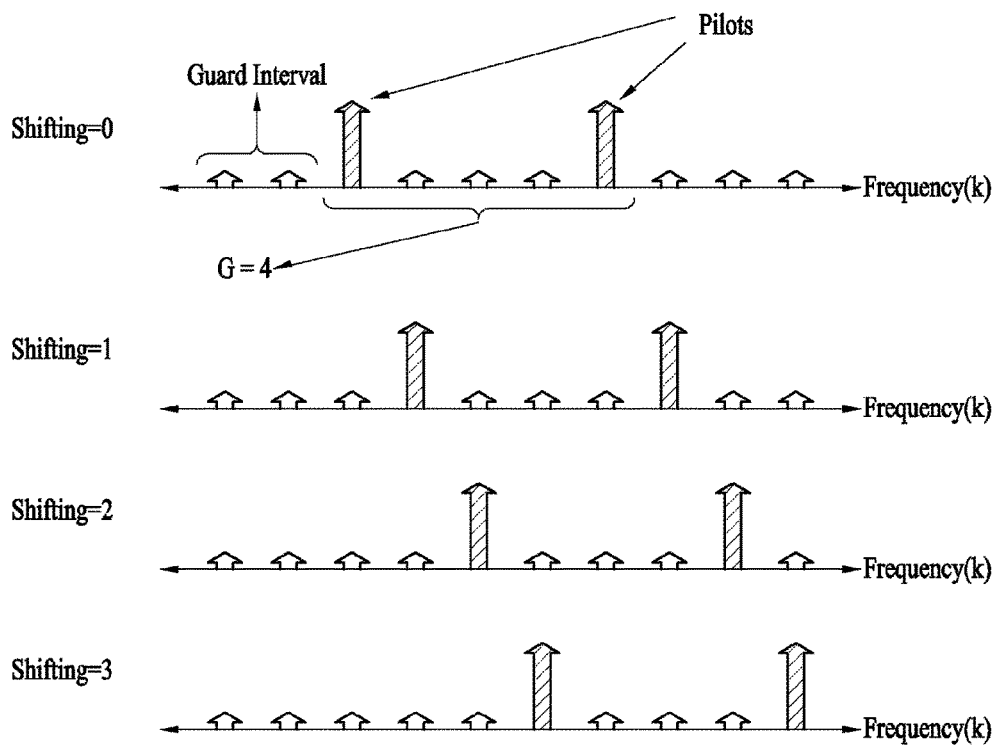

Referring to FIG. 20, pilot signals have a pilot distance of 4, differently from FIG. 19. In this case, circular shifting can be performed up to three times. A total of 4 pilot sequences having shifting=0, 1, 2 and 3 form a sequence set, as shown in FIG. 20. The 4 different pilot sequences can be transmitted to the receiver and the receiver can discriminate the 4 pilot sequences. Transmitted pilot sequences in the sequence set respectively correspond to 4 different pieces of information, and thus the receiver can acquire additional information (i.e., a signature) corresponding to 2 bits. Specifically, the receiver can recognize that 2 bits information corresponding to "00" is received when the pilot sequence of shifting=0 is received, recognize that 2 bits information corresponding to "01" is received when the pilot sequence of shifting=1 is received, recognize that 2 bits information corresponding to "10" is received when the pilot sequence of shifting=2 is received and recognize that 2 bits information corresponding to "11" is received when the pilot sequence of shifting=3 is received.

Figure 21:
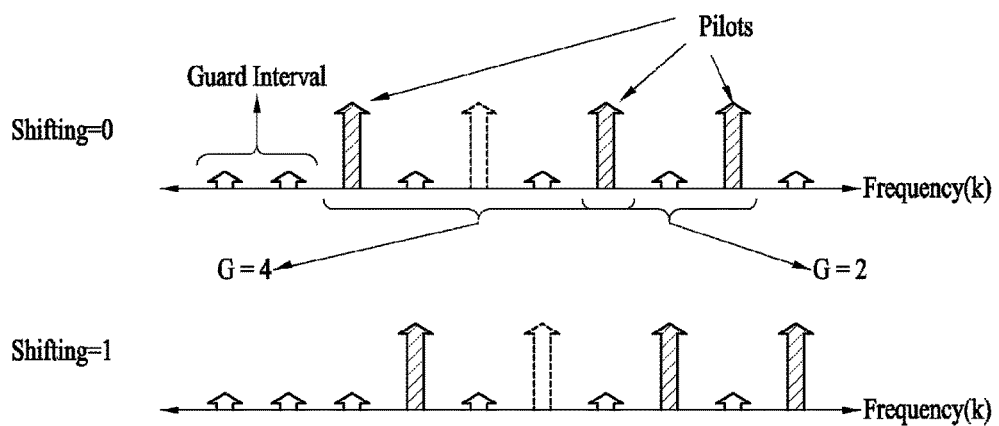

In an embodiment illustrated in FIG. 21, pilot signals in a pilot sequence do not have a regular interval, distinguished from FIGS. 19 and 20. For example, the distance between the first pilot signal and the second pilot signal is 4, whereas the distance between the third pilot signal and the fourth pilot signal is 2 in the upper part of FIG. 21.

However, if the pilot signal indicated by a dotted line is a zero-power pilot, the pilot distance in the embodiment of FIG. 21 becomes 2 as in FIG. 19. In this manner, a sequence set composed of 2 different pilot sequences can be defined through shifting even when a pilot signal interval is irregular. In the case of a pilot distance of 4, a sequence set composed of 4 different pilot sequences is defined.

3.1.1 Shifting Pilot Sequence Identification Method

The method through which the transmitter shifts pilot signals to generate a sequence set and transmits information using the sequence set has been described. A description will be given of a method of identifying a received pilot sequence by the receiver with reference to FIGS. 22 and 23.

The receiver can identify a shifting pilot sequence generated through the method described above using one of a frequency domain based identification method and a time domain based identification method.

Figure 22:
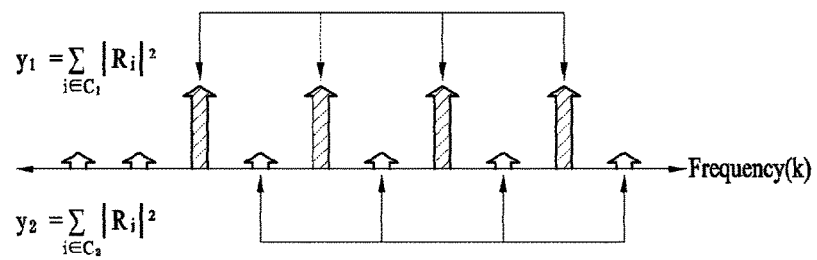
FIGS. 22 and 23 are diagrams illustrating a pilot sequence identification method.

First, the frequency domain based identification method is described. In FIG. 22, $R_i$ denotes a signal observed in an i-th subcarrier and defined as $C_1=\{3,5,7,9\}$ or $C_2=\{4,6,8,10\}$. The receiver separates signals received in subcarriers on the basis of $C_1$ and $C_2$ to calculate $y_1$ and $y_2$. Then, the receiver compares $y_1$ with $y_2$ to estimate a pilot sequence û transmitted by the transmitter according to the following mathematical expression 1.

$$\hat{u} = \arg\max\{y_1, y_2\} \quad \text{[Expression 1]}$$

The receiver can be aware of a subcarrier through which a pilot signal is received by comparing $y_1$ with $y_2$ and thus can recognize which pilot signal in a sequence set has been transmitted by the transmitter.

In the case of FIG. 20, the pilot signals as defined as $C_1=\{3,7\}$, $C_2=\{4,8\}$, $C_3=\{5,9\}$ and $C_4=\{6,10\}$ and $\{y_1, y_2, y_3, y_4\}$ is calculated. Then, the receiver can be aware of a subcarrier through which a pilot sequence has been transmitted by comparing $\{y_1, y_2, y_3, y_4\}$ according to the following mathematical expression 2 and recognize the pilot sequence selected by the transmitter from a sequence set.

$$\hat{u} = \arg\max\{y_1, y_2, y_3, y_4\} \quad \text{[Expression 2]}$$

If the receiver recognizes a selected pilot sequence, the receiver can check additional information corresponding to the pilot sequence, as described above.

Figure 23:
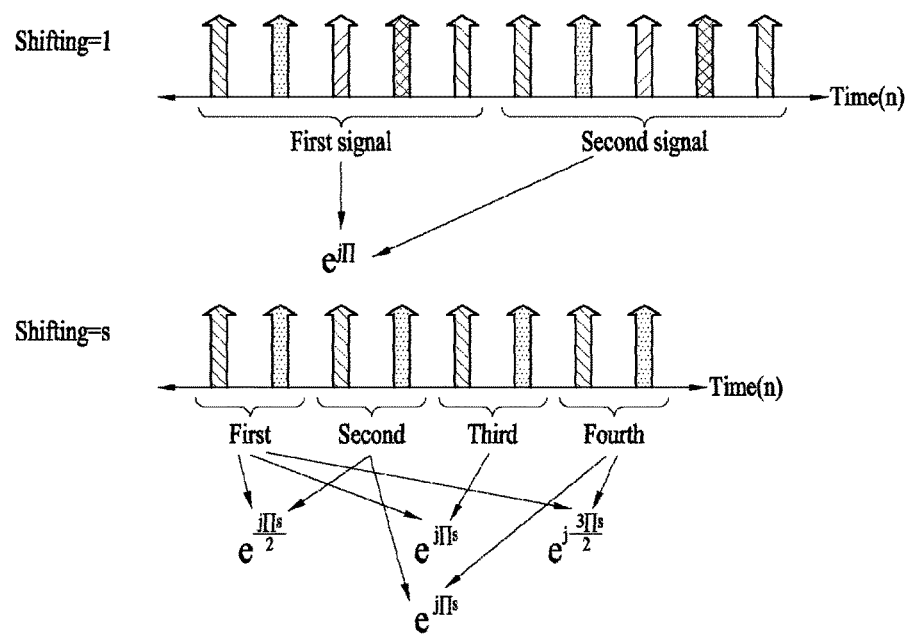

A description will be given of the time domain based identification method with reference to FIG. 23. When shifting=0 in FIG. 19, first signals and second signals appear in the same pattern in the time domain, as illustrated in FIG. 18. In the case of shifting=1, first signals and the second signals in the time domain have a phase difference therebetween, as shown in the upper part of FIG. 23. Such a phase difference is defined by the following mathematical expression 3.

$$e^{j\frac{2\pi sd}{G}} \quad \text{[Expression 3]}$$

In Expression 3, S is a shifting value, d denotes an index difference between compared signals and G denotes a pilot distance. For example, when a first signal is compared with a second signal, $d=2-1=1$. Accordingly, when shifting=1 in FIG. 19, a phase difference between a first signal and a second signal is $e^{j\pi}$ and the second signal can be acquired by multiplying the first signal by $e^{j\pi}$.

Through this procedure, the receiver can estimate a circular shifting value in the time domain according to the following mathematical expression 4.

$$\hat{s} = f_Q\left(\frac{\text{angle}(r1^\dagger r2)}{\pi}\right) \quad \text{[Expression 4]}$$

In Expression 4, $r_1$ and $r_2$ are vectors respectively representing a first signal and a second signal, angle(x) is a function of extracting the angle of a variable x and $f_Q$ is a function of matching an estimated value $$\left(\text{e.g.}\right)\frac{\text{angle}(r_1^\dagger r_2)}{\pi}$$

to an available circular shifting value. For example, when $$G = 2, \frac{\text{angle}(r_1^\dagger r_2)}{\pi} = 0.8,$$

the function $f_Q$ matches the result value to 1.

Expression 4 is normalized to represent an algorithm for estimating a circular shifting value when the pilot distance is G by the following mathematical expression 5.

$$\hat{s} = f_Q\left(\frac{\text{angle}(\sum_{i=1}^{G-1} r_i^\dagger r_{i+1})}{2\pi/G}\right) \quad \text{[Expression 5]}$$

In Expression 5, denotes the vector of an i-th received signal. A description will be given of an example using Expression 5. The lower part of FIG. 23 shows received signals in the time domain when $N_0=8$ and $G=4$. $N_0$ denotes an OFDM symbol length. In the upper part of FIG. 23, $N_0=10$ and $G=2$. In the example shown in the lower part of FIG. 23, the algorithm of Expression 5 can be represented by the following mathematical expression 6.

$$\hat{s} = f_Q\left(\frac{\text{angle}\left(\sum_{n=1}^{3} r_n^* r_{n+1}\right)}{\pi/2}\right) \quad \text{[Expression 6]}$$

According to another embodiment of the present invention, in definition of a sequence set between the transmitter and the receiver, the sequence set can be defined such that a shifting difference between pilot sequences is maximized.

Referring to FIG. 20, when G=4 and the transmitter intends to transmit 2 pilot sequences for transmission of additional information corresponding to 1 bit, a total of 6 sequence sets can be defined as represented by the following mathematical expression 8.

(Sequence1,Sequence2)={(0,1),(0,2),(0,3)(1,2)(1,3)(2,3)}      [Expression 8]

In Expression 8, (a, b) denotes a sequence set composed of a pair of a pilot signal having shifting=a and a pilot signal having shifting=b. Sequence set (0, 3) improves the performance of the identification algorithm of the receiver, compared to other sequence sets {(0, 1), (0, 2), (1, 2), (1, 3), (2, 3)} because the sequence set (0, 3) can reduce the influence of CFO more than other sequence sets. For example, when CFO is 1/−1, all pilot signals are circularly shifted by 1 to the right/left in the frequency domain. In this case, ambiguity is generated in sequence sets {(0, 2), (1, 3)} when CFO exceeds 1. Similarly, ambiguity may be generated in sequence sets {(0, 1), (1, 2), (2, 3)} when CFO exceeds 0.5.

When the transmitter uses the sequence set (0, 3), the receiver can consider that a signal with shifting=0 is received even if a signal with shifting=1 is received and consider that a signal with shifting=3 is received even if a signal with shifting=2 is received. That is, ambiguity is not generated even when CFO is 1/−1. Accordingly, when a circular shifting value of pilot sequences forming a sequence set is maximized, performance deterioration due to CFO can be minimized. In this case, the number of pieces of information that can be additionally transmitted (i.e., the number of bits) is reduced.

According to another embodiment, pilot signals of the aforementioned shifting pilot sequences can be generated using a Chu-sequence. When pilot signals are generated using the Chu-sequence, a PAPR (Peak to Average Power Ratio) of pilot signals in the time domain is reduced.

The Chu-sequence is defined by the following mathematical expression 9.

$$X_{k=\{1,2,\ldots,N_s\}} = \begin{cases} e^{j2\pi R k^2/N_s}, & \text{for } N_s \text{ being even} \\ e^{j2\pi R k(k-1)/N_s}, & \text{for } N_s \text{ being odd} \end{cases} \quad \text{[Expression 9]}$$

In Expression 9, k is a subcarrier index in the frequency domain, $X_k$ is a value in subcarrier k or a k-th element in the Chu-sequence and $N_s$ is the length of the Chu-sequence. As can be known from Expression 9, all elements of the Chu-sequence have a fixed magnitude of 1 and only phases change.

Figure 24:
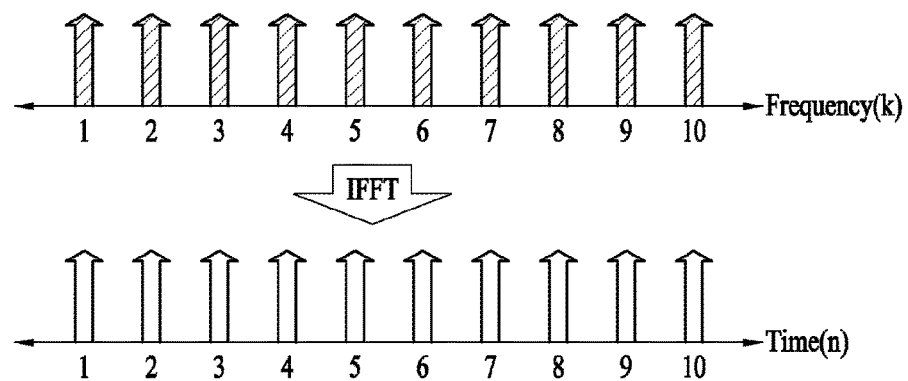
FIGS. 24 to 26 are diagrams illustrating a Chu sequence and CAZAC properties.
Figure 25:
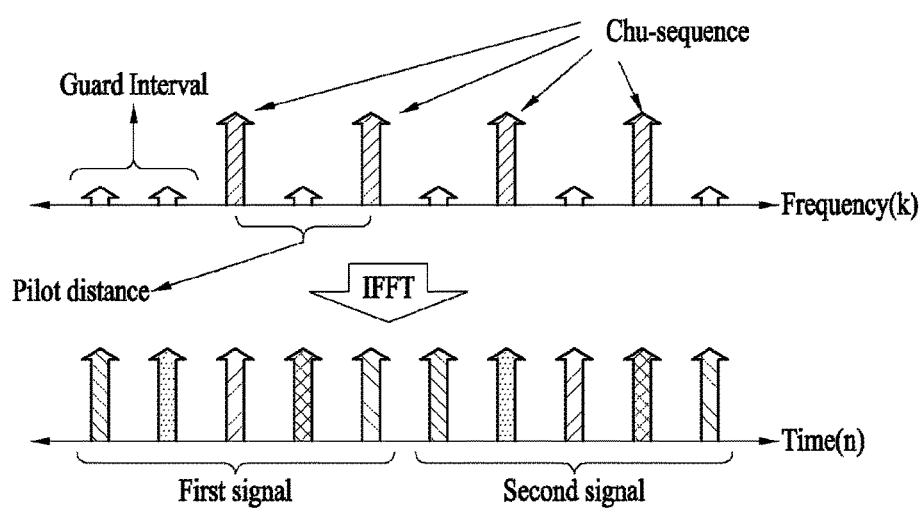
Figure 26:
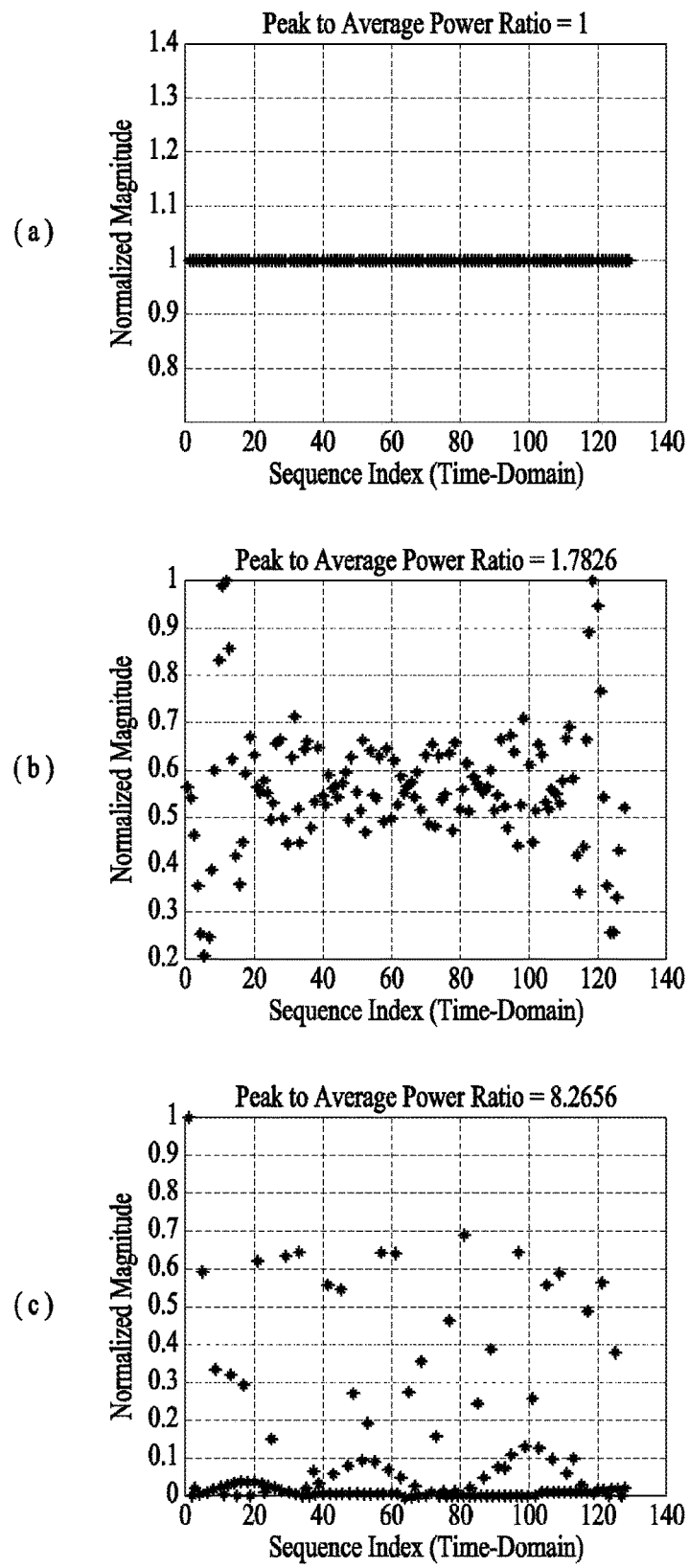

FIGS. 24 to 26 are diagrams illustrating a Chu sequence and CAZAC properties.

The upper part of FIG. 24 shows a Chu-sequence with $N_s$=10 according to Expression 9. The most outstanding characteristic of the Chu-sequence is that magnitudes of all elements are fixed to 1 even when frequency domain signals are transformed into time domain signals through IFFT. That is, signals in the time domain, shown in the lower part of FIG. 24, have a magnitude of 1 and only phases change.

An embodiment of using the Chu-sequence as OFDM pilot signals is illustrated in FIG. 25. In FIG. 25, an OFDM symbol length is defined as $N_o$. When the elements of the Chu-sequence are used as pilot signals in the OFDM frequency domain, signals in the time domain have the following characteristics.

When the distance between neighboring pilot signals in the frequency domain is G, signals in the time domain are defined as up to a G-order signal. That is, the order of pilot signals repeated in the time domain corresponds to the distance between neighboring pilot signals.

When $N_o$=$cN_s$ (c being a positive integer) is satisfied, all pilot signals in the time domain have a magnitude of 1 like the Chu-sequence. In this case, PAPR of pilot signals in the time domain becomes 1. The PAPR is defined by the following mathematical expression 10 and has a minimum value of 1.

$$PAPR = \frac{\text{Peak power}}{\text{average power}} \quad \text{[Expression 10]}$$

In Expression 10, the numerator means peak power from among powers of time domain elements and the denominator means average power of the time domain signals. When a base station amplifies and transmits OFDM symbols, a maximum number of 01-DM symbols that can be amplified is determined by an element having a maximum magnitude from among the time domain elements. This is because a result of amplification of all elements of the time domain should not exceed peak power of an amplifier. Accordingly, when all pilot signals in the time domain have a magnitude of 1, transmitted signals can be amplified to peak power of the amplifier.

If a specific pilot signal has a magnitude of 2 in the time domain, a transmitted signal can be amplified up to ½ of the aforementioned case. That is, a loss of 3 dB is generated compared to the case in which all pilot signals have a magnitude of 1. When $N_o \neq cN_s$, all elements in the time domain have different magnitudes unlike the Chu-sequence. Accordingly, the PAPR exceeds 1.

The above-described characteristics of the Chu-sequence are shown in FIG. 26. FIG. 26 is a diagram illustrating a CAZAC (Constant Amplitude Zero Auto-Correlation) sequence as the proposed pilot sequence. FIG. 26(a) shows magnitudes of first signals from among pilot signals in the time domain when $N_0$=256, $N_s$=128 and GI=0 and FIG. 26(b) shows magnitudes of first signals from among pilot signals in the time domain when $N_0$=256, $N_s$=122 and GI=6. The pilot signals shown in FIG. 26(b) have different magnitudes, distinguished from the pilot signals shown in FIG. 26(a). To achieve a case in which all pilot signals have a magnitude of 1 as in FIG. 26(a), the guard interval of the pilot signals needs to be 0 but the guard interval of 0 cannot be realized.

FIG. 26(c) shows magnitudes of time domain pilot signals generated using a VHT (Very High Throughput) sequence. In this case, a PAPR is 8.26 which is very high. Consequently, when the Chu-sequence is used as pilot signals, a relatively low PAPR can be obtained compared to other sequences even though a theoretical PAPR of 1 cannot be obtained.

3.2 Shifting Pilot Sequence Generation Method 2

Figure 27:
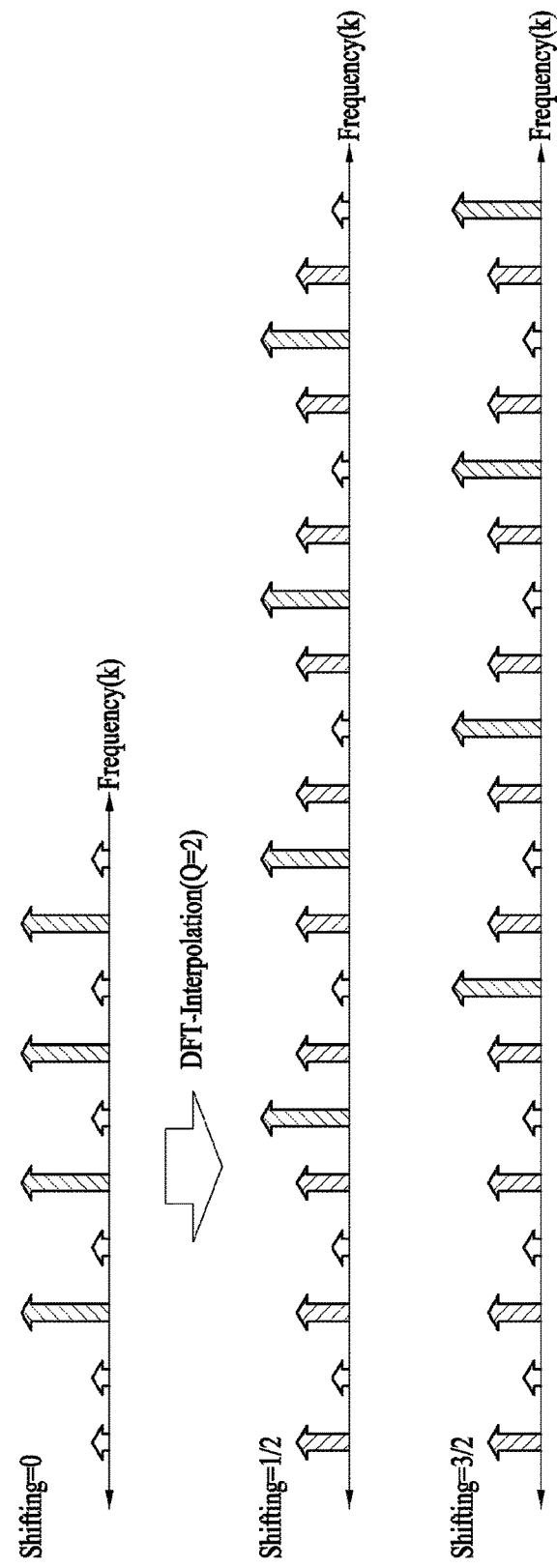
FIG. 27 is a diagram illustrating fraction based shifting of a pilot sequence.

FIG. 27 is a diagram illustrating another shifting pilot sequence according to a proposed embodiment. Embodiments in which all pilot sequences are circularly shifted to generate shifting pilot sequences in the frequency domain have been described. A description will be given of an embodiment in which shifting pilot sequences are generated in the time domain. The transmitter can generate shifting pilot sequence in the time domain according to the following mathematical expression 11.

$$x(s)=D(s)x(0), \quad 0 \le s \le G-1 \quad \text{[Expression 11]}$$

where $D(s)=\text{diag}\{1 \; e^{j2\pi s/N_o} \; e^{j4\pi s/N_o} \; \ldots \; e^{j2\pi s(N_o-1)/N_o}\}$ According to Expression 11, the transmitter obtains effects of generating circular shifting in the frequency domain by changing phases of time domain pilot signals. In Expression 11, x(0) denotes a pilot signal vector corresponding to shifting=0 in the time domain and x(s) denotes a pilot signal vector corresponding to shifting=s in the time domain. D(s) represents a diagonal matrix and the diagonal matrix shifts the phase of x(0) element by element. According to Expression 11, it is possible to obtain effects of circularly shifting all pilot signals by s in the frequency domain.

When a shifting pilot sequence is generated in the time domain according to Expression 11, a difference from generation of a shifting pilot sequence in the frequency domain is generated as follows. When a shifting pilot sequence is generated in the frequency domain, s is limited to integers. Here, s is not limited to positive integers because circular shifting to the left (right) can be performed when s is a negative (positive) integer. On the other hand, when a shifting pilot sequence is generated in the time domain, s is not limited to integers and even fractions can be permitted therefor.

For example, when the minimum unit of s is assumed to be ½, s can be defined as $$s \in \left\{0, \frac{1}{2}, 1, \frac{3}{2}, 2, \ldots, G-\frac{1}{2}, G-1\right\}.$$

In this example, $\log_2 G$ bits can be additionally transmitted when s is limited to integers, whereas information about $\log_2 G+1$ bits can be additionally transmitted when s is not limited to integers. That is, 1-bit information is additionally transmitted compared to a case in which s is limited to integers. If the minimum unit of s is limited to $1/Q$, a maximum quantity of information that can be transmitted through the pilot sequence increases to $(\log_2 G+\log_2 Q)$ bits.

Consequently, when a shifting pilot sequence is generated in the time domain, fractions can be permitted for s and thus a maximum quantity of information that can be transmitted increases. To use a fraction as s, Expression 11 is used.

3.2.1 Shifting Pilot Sequence Identification Method

A description will be given of a method of identifying a shifting pilot sequence by the receiver when the aforementioned method of generating a shifting pilot sequence in the time domain is applied. A method of identifying a shifting pilot sequence in the time domain and a method of identifying a shifting pilot sequence in the frequency domain are proposed, similarly to the aforementioned method of identifying a shifting pilot sequence in the frequency domain.

As a method of identifying a shifting pilot sequence in the time domain, the time domain based identification method described in 3.1.1 can be applied. That is, the receiver can correctly estimate s by calculating a phase difference between an i-th signal and an (i+1)-th signal in the time domain according to Expression 5 even if s is a fraction. Here, $\hat{f}_Q$ matches the estimation result to a value closest to $$s \in \left\{0, \frac{1}{2}, 1, \frac{3}{2}, 2, \ldots, G-\frac{1}{2}, G-1\right\}.$$

When the identification method described in 3.1.1 is used as the method of identifying a shifting pilot sequence in the frequency domain, s corresponding to a fraction cannot be estimated. To solve this problem, the receiver performs DFT (Discrete Fourier Transform) based interpolation. DFT based interpolation is defined as represented by the following mathematical expression 12.

$$\tilde{g} = F^{(Q)}\tilde{r} \quad \text{[Expression 12]}$$

$$\text{where } \tilde{r} = \left[r^T [0_{N_o}^T \; \overbrace{\ldots}^{1\times(Q-1)N_o} \; 0_{N_o}^T]\right]^T$$

In Expression 12, r denotes a received time domain pilot signal vector and $0_{N_o}^T$ denotes a zero vector having a length of $N_0$. The size of $[0_{N_o}^T \ldots 0_{N_o}^T]T$ is defined as $((Q-1)N_0 \times 1)$ Accordingly, r is a zero-padded vector. F denotes a DFT matrix and $F^{(Q)}$ indicates a DFT matrix extended Q times.

As to Expression 12, when a DFT matrix with Q=2 and F=256 is assumed, $F^{(2)}$ is a 512 DFT matrix. A vector $\tilde{g}$ calculated through DFT interpolation is 512×1. Here, circular shifting in the time domain according to $$s \in \left\{0, \frac{1}{2}, 1, \frac{3}{2}, 2, \ldots, G-\frac{1}{2}, G-1\right\}$$

is seen as s∈{0, 1, 2, 3, 4, . . . , 2G−1, 2G−2} to the receiver. That is, DFT interpolation produces oversampling effect that changes denominator based circular shifting by the transmitter in the frequency domain into integer based circular shifting from the viewpoint of the receiver. For integer based circular shifting, the frequency domain based identification method described with reference to Expressions 1 and 2 can be applied and thus the receiver can identify a transmitted sequence.

Referring to FIG. 27, the shifting value s is assumed to be ½ and 3/2 in a system having $N_0=10$, $N_s=5$ and Q=2. In addition, the receiver uses a DFT matrix having a size of 20. Here, considering that the guard interval of pilot signals has been interpolated from 2 to 4, the pilot signals are circularly shifted by 1 to the right in practice. Similarly, when s is 3/2, pilot signals are circularly shifted by 3 to the right. In FIG. 27, although signals having an intermediate magnitude have a predetermined magnitude differently from signals with a small magnitude (e.g., zero-power pilots), they still have a magnitude lower than normal pilot signals.

The receiver can identify a pilot sequence depending on a result of circular shifting by an integer in the frequency domain through the frequency domain based pilot signal identification method described above.

The method of transmitting, by a transmitter, additional information to a receiver by generating a pilot sequence composed of pilot signals distributed at specific intervals and the method of identifying the pilot sequence by the receiver have been described. The transmission method and the identification method are based on the fact that the receiver can identify pilot signals even if the pilot signals have been circularly shifted by an integer and transmitted.

Fraction based circular shifting can be achieved through phase change in the time domain. In this case, a larger quantity of information can be transmitted.

4. Proposed Pilot Sequence Transmission and Reception Method

First of all, the concept of carrier frequency offset (CFO) briefly described above will be described. CFO is caused by at least one of a frequency difference between oscillators included in a transmitter and a receiver and Doppler effect and refers to an error generated when the receiver measures frequency.

Figure 28:
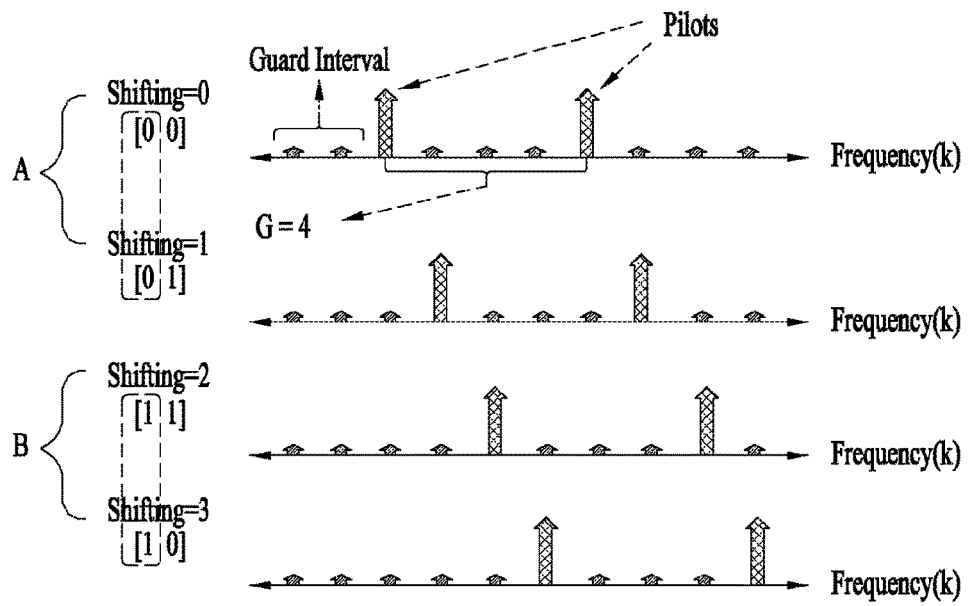
FIG. 28 is a diagram illustrating a procedure of mapping a signature to a pilot sequence.

A CFO value can be divided into an integer and a fraction (e.g., an integer CFO is 2 and a fraction CFO is 0.5 when CFO=2.5). An integer CFO cyclically shifts a frequency subcarrier and a fraction CFO generates interference between subcarriers. Referring to FIG. 28, when CFO of 1 or −1 appears although a transmitter has transmitted a sequence with shifting=1, a receiver misrecognizes that a sequence with shifting=2 or a sequence with shifting=0 has been received. That is, the receiver identifies the wrong sequence due to the influence of an integer CFO even when noise is not considered.

When CFO is generated, there is high probability that the absolute value of CFO is relatively small. Some papers assumed that CFO conforms to normal distribution based on 0. Accordingly, when the receiver misrecognizes a sequence when any CFO is considered, the probability of misrecognizing a sequence transmitted by the transmitter as a sequence close to the transmitted sequence (i.e., a small shifting value difference) is higher than the probability of misrecognizing the sequence as a sequence spaced apart therefrom. For example, when the sequence with shifting=1 is transmitted in FIG. 28, the probability of misrecognizing the sequence with shifting=1 as the sequence with shifting=0 or the sequence with shifting=2 is higher than the probability of misrecognizing the sequence with shifting=1 as a sequence with shifting=3.

A description will be given of a proposed pilot sequence generation method in consideration of such CFO properties. FIG. 28 is a diagram illustrating a procedure of mapping a signature to a pilot sequence.

According to an embodiment, in the case of signatures mapped to neighboring sequences in the frequency domain from among pilot sequences included in a sequence set, the signatures can be mapped such that bit values indicated thereby have a difference of 1 bit. Referring to FIG. 28, the sequence with shifting=1 follows the sequence with shifting=0. In this case, the sequence with shifting=1 and the sequence with shifting=0 are called neighboring (pilot) sequences. Similarly, the sequence with shifting=2 is a neighboring sequence of the sequence with shifting=1. On the other hand, the sequence with shifting=2 and the sequence with shifting=0 are not neighboring sequences.

According to the proposed embodiment, signatures can be mapped to neighboring sequences in the frequency domain such that bit values indicated by additional information have a difference of 1 bit. That is, the sequence with shifting=0 can be mapped to bits [0, 0] and transmitted to the receiver. Here, the sequence with shifting=1 neighboring the sequence with shifting=0 can be mapped to bits [0, 1]. Similarly, when bits are mapped to the sequence with shifting=2, bits [1, 0] can be mapped to the sequence with shifting=3.

According to this embodiment, only an error corresponding to 1 bit is generated even when the receiver misrecognizes a pilot sequence, minimizing generation of error. This is because the probability that the receiver misrecognizes a specific sequence as a neighboring sequence is high, as described above. In other words, when an environment in which random CFO is generated is assumed, the probability that the receiver misrecognizes a sequence transmitted from the transmitter as a neighboring sequence is higher than the probability of misrecognizing the sequence as a non-neighboring sequence. Consequently, the number of erroneous bits can be stochastically minimized if neighboring sequences in the frequency domain are mapped such that bit values have a difference of 1 bit, as described above with reference to FIG. 28.

Figure 29:
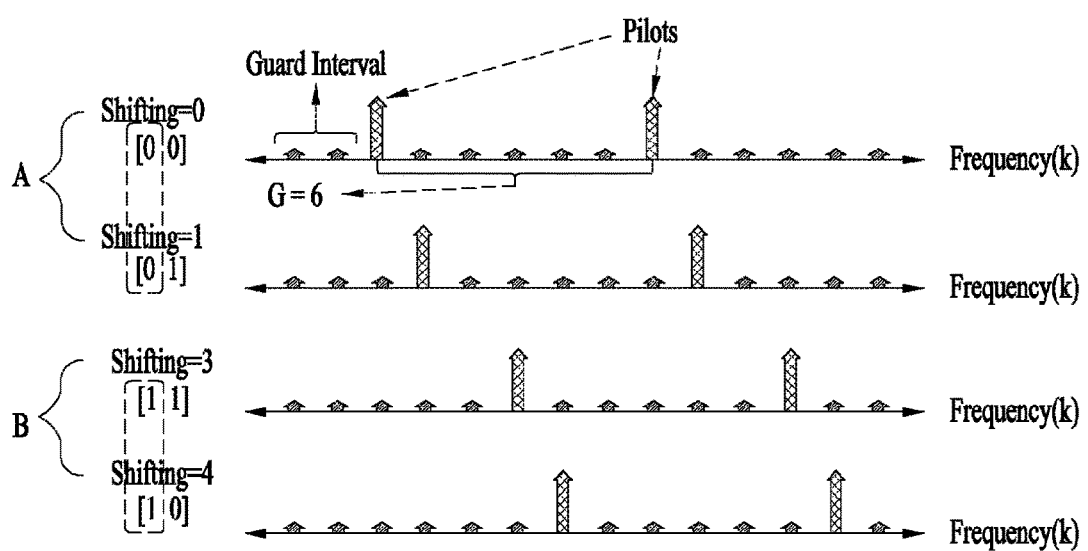
FIG. 29 is a diagram illustrating a procedure of mapping signatures to pilot sequences of an asymmetric sequence set.

FIG. 29 is a diagram illustrating a procedure of mapping signatures to pilot sequences of an asymmetric sequence set.

First, an asymmetric sequence set will be described. Four pilot sequences shown in FIG. 29 respectively have shifting values of 0, 1, 3 and 4. Two upper pilot sequences indicated as group A have a shifting value difference of 1 therebetween and the second and third pilot sequences have a shifting value difference of 2 therebetween. Similarly, the third and fourth pilot sequences have a shifting value difference of 1 therebetween, like the first and second sequences. When a sequence set has two or more shifting value differences, 1 and 2, between pilot sequences, as described above, this sequence set is called an asymmetric sequence set. The sequence set shown in FIG. 29 is an asymmetric sequence set, whereas the sequence set shown in FIG. 28 is a symmetric sequence set because the sequence set has a shifting value of 1 for all pilot sequences.

A shared bit and a non-shared bit defined in an asymmetric sequence set will be described. Referring to FIG. 29, pilot sequences belonging to group A have shifting values of 0 and 1 and thus have a shifting value difference of 1. Similarly, pilot sequences belonging to group B have shifting values of 3 and 4 and thus have a shifting value difference of 1. However, the second pilot sequence and the third pilot sequence belong to different groups and have a shifting value difference of 2 therebetween. A transmitter sets pilot sequences such that pilot sequences having a minimum shifting value difference therebetween share the first bit of a signature of 2 bits respectively mapped thereto. In FIG. 29, the pilot sequences belonging to group A are respectively mapped to "00" and "01" of a signature and thus share the first bit "0". Similarly, the pilot sequences belonging to group B are respectively mapped to "11" and "10" of a signature and thus share the first bit "1".

A specific bit of a signature shared by pilot sequences having a minimum shifting value difference therebetween is called a "shared bit" (the first bit in FIG. 29) and a specific bit of the signature which is not shared is called a "non-shared bit" (the second bit in FIG. 29).

According to a proposed embodiment, the transmitter can set a shared bit shared by sequences having a small shifting value difference therebetween such that the shared bit means information determined to have high importance. Conversely, the transmitter can set a non-shared bit such that the non-shared bit means information determined to have low importance. If a sequence with shifting=1 is selected, the probability that a receiver misrecognizes the sequence with shifting=1 as a sequence with shifting=0 is higher than the probability that the receiver misrecognizes the sequence with shifting=1 as a sequence with shifting=3. Accordingly, when a sequence with shifting=1 to which [0, 1] is mapped is transmitted, the probability that a receiver misrecognizes the sequence as a sequence with shifting=0 to which [0, 0] is mapped is higher than the probability that the receiver misrecognizes the sequence as a sequence to which [1, 1] is mapped even if error is generated in the receiver. Therefore, if information with high importance is mapped to a shared bit, the receiver loses only information mapped to a non-shared bit and can receive information with high importance mapped to the shared bit with reliability even if a false alarm is generated in the receiver.

Examples of information with high importance may include a packet ID, a basic service set ID (BSSID), bandwidth information and the like. The receiver reads a packet ID and determines whether a currently received packet is destined therefor. When the packet is not for the receiver, the receiver does not perform additional decoding so as to save power, and thus correct determination of the packet ID is very important from the viewpoint of yield of the communication system. Furthermore, next-generation Wi-Fi needs to support a communication environment in which a lot of BSSs are located in proximity to one another. In this case, a receiver checks whether a BSS thereof performs packet transmission by reading the BSSID. When the receiver reads the BSSID and recognizes that the BSS performs packet transmission, collision may occur in a transmitter even if a channel is idle, delaying packet transmission of the receiver. Moreover, information for scheduling uplink transmission and information for scheduling downlink transmission can be information with high importance. In addition, bandwidth information is the most fundamental information for communication between a transmitter and a receiver. The aforementioned information is an example of information with high importance. The examples described above are merely examples of information with high importance and various types of control information in addition to the examples can be classified as an information group with high importance.

Examples of information with low importance may include the number of transmit antennas, the position of a PDCCH (Physical Downlink Control Channel) or ePDCCH (evolved PDCCH), and the like. A receiver detects such information through blind decoding in legacy communication systems. Blind decoding requires many attempt procedures, increasing system complexity and latency. Accordingly, if a transmitter notifies the receiver of such information, the receiver can decrease a burden of blind decoding. In addition, even if such information is incorrectly delivered to the receiver, the receiver can detect the information according to legacy blind decoding, reducing the influence due to information delivery failure. Therefore, the aforementioned information can be classified as information with relatively low importance. The examples described above are merely examples of information with low importance and various types of control information in addition to the examples can be classified as an information group with low importance.

A transmitter discriminates information with high importance from information with low importance as described above. Information with high importance and information with low importance may be previously discriminated and grouped by the transmitter. For example, the transmitter can group information determined to have high importance as a group and group information determined to have low importance as another group. Then, the transmitter sets sequences having a small shifting value difference in a sequence set as a group (groups A and B in FIG. 29). The transmitter maps information with high importance (i.e., information selected from the group including information determined to have high importance) to a shared bit and maps information with low importance (information selected from the group including information determined to have low importance) to a non-shared bit in a group. Through this procedure, the transmitter can map signatures to pilot sequences in an asymmetric sequence set.

Consequently, the transmitter differently sets an error generation probability in a group and an error generation probability out of the group. In addition, the transmitter maps information with high importance to a shared bit in a group to reduce an error generation probability with respect to the information with high importance, thereby more efficiently protecting the information with high importance.

Figure 30:
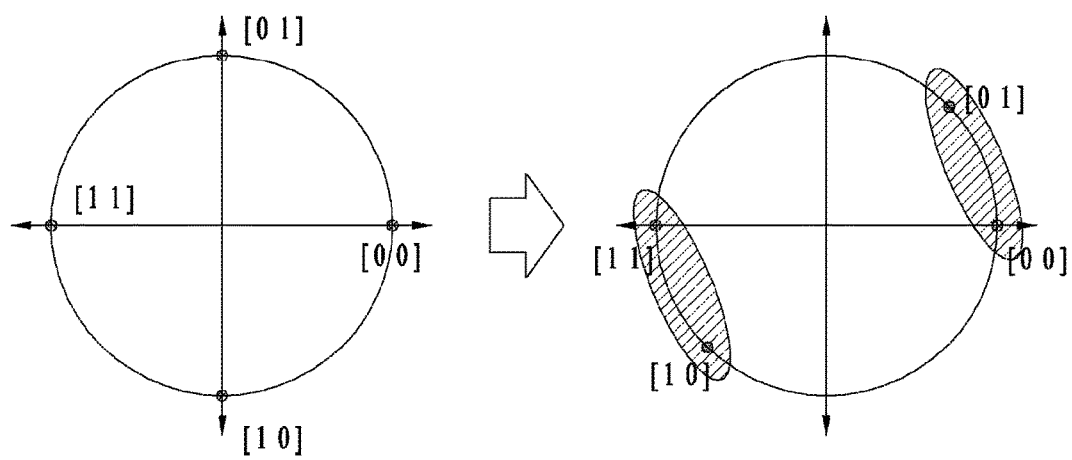
FIG. 30 is a diagram illustrating an asymmetric sequence set mapping procedure according to another embodiment.

FIG. 30 is a diagram illustrating another embodiment of an asymmetric sequence set mapping procedure.

As described above in 3.1, in a procedure through which the transmitter generates an asymmetric sequence set, cyclic shifting may be performed in the frequency domain to generate the sequence set. Alternatively, the transmitter may generate a sequence set by changing phases of signals in the time domain. When an asymmetric sequence set is used according to the embodiment described above with reference to FIG. 29, the phase shifting value s of Expression 11 for transmitting a [0, 1] signature is 1 and the phase shifting value s for transmitting a [1, 1] signature is 3. Setting the phase shifting value to a fraction in Expression 11 has been described above.

That is, according to the proposed embodiment, the transmitter sets an inconstant phase shifting value in a procedure through which the transmitter shifts the phase of pilot signals in the time domain to generate an asymmetric sequence set. Accordingly, sequences having a small phase shifting value difference are discriminated from sequences having a large phase shifting value difference in the sequence set, and signatures are mapped to the sequences having a small phase shifting value difference such that a shared bit indicates the same information (control information determined to have high importance).

Referring to FIG. 30, a phase shifting value is constant, i.e., $\pi/2$, in the left part of FIG. 30. Conversely, a phase shifting difference between a sequence corresponding to bits [0, 0] and a sequence corresponding to bits [0, 1] is $\pi/4$ and a phase shifting difference between a sequence corresponding to bits [1, 0] and a sequence corresponding to bits [1, 1] is also $\pi/4$ in the right part of FIG. 30. However, a phase shifting difference between the sequence corresponding to bits [0, 1] and the sequence corresponding to bits [1, 1] is $3\pi/4$ and a phase shifting difference between the sequence corresponding to bits [0, 0] and the sequence corresponding to bits [1, 0] is $3\pi/4$.

In the case illustrated in the right part of FIG. 30, the first bit has a lower error generation possibility due to CFO than the second bit, compared to the case illustrated in the left part of FIG. 30. Accordingly, when information with high importance is mapped to the first bit and information with relatively low importance is mapped to the second bit, the transmitter can transmit information with reliability depending on importance of information.

Referring to Expression 11, the phase shifting value s is ⅛ when the sequence corresponding to [0, 1] is transmitted and ⅝ when the sequence corresponding to [1, 0] is transmitted.

Figure 31:
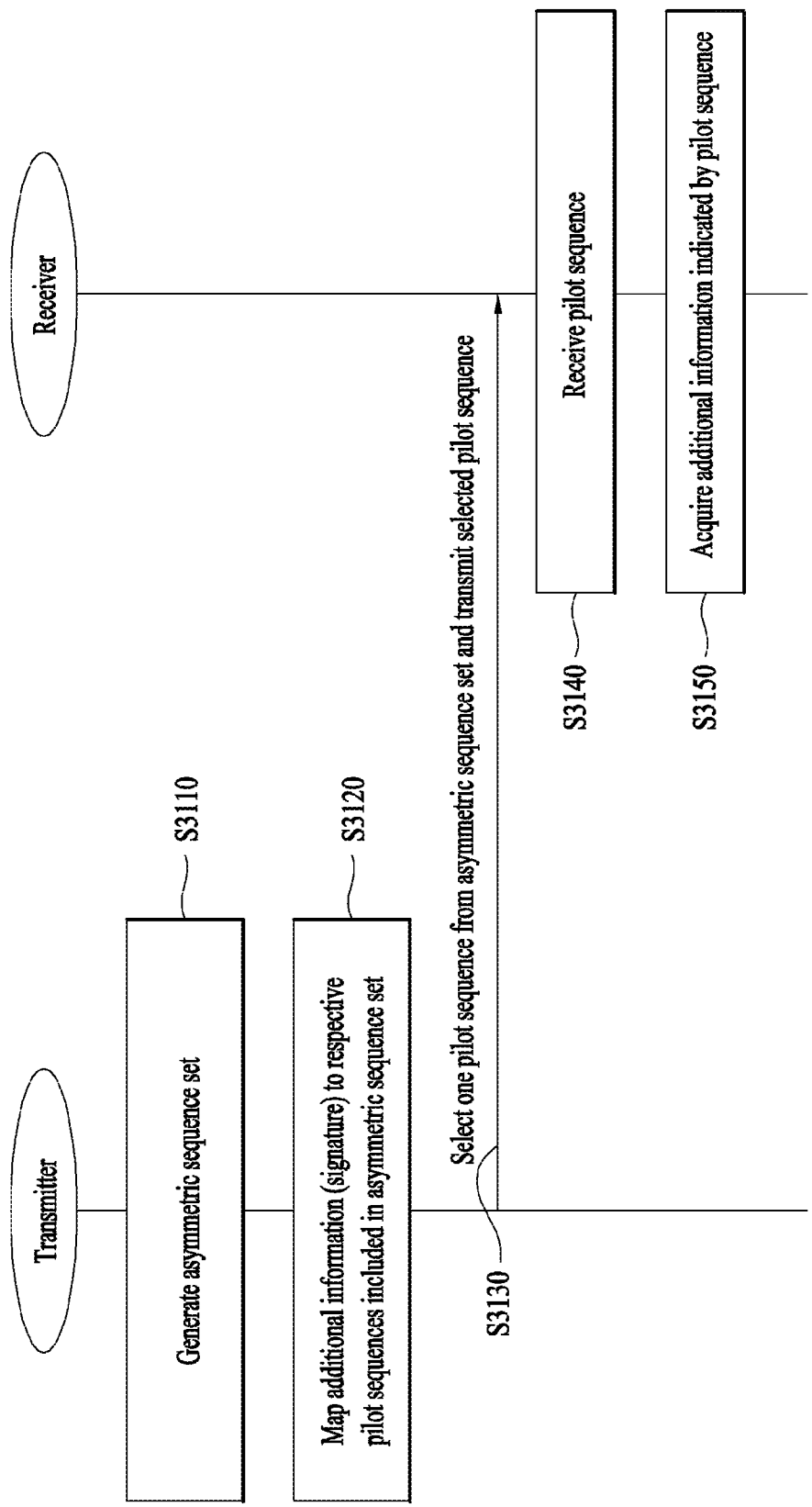
FIG. 31 is a flowchart illustrating a pilot sequence transmission method according to a proposed embodiment.

FIG. 31 is a flowchart illustrating a pilot sequence transmission method according to a proposed embodiment. FIG. 31 illustrates a time sequential flow of operations of a transmitter and a receiver on the basis of the embodiments described above. Accordingly, the above description can be equally or similarly applied to the pilot sequence transmission method even if detailed description is omitted in FIG. 31.

The transmitter generates an asymmetric sequence set (S3110). The transmitter may set the sequence set while changing a phase shifting value of pilot signals in the time domain. In this case, the phase shifting value can be set to a fraction, enabling generation of a relatively large amount of additional information.

The asymmetric sequence set refers to a sequence set having an inconstant shifting value difference between pilot sequences. The transmitter maps additional information (signatures) to a plurality of pilot sequences constituting the asymmetric sequence set (S3120).

In this procedure, information to be transmitted from the transmitter to the receiver can be classified into two or more groups depending on importance thereof. That is, the transmitter can discriminate information having relatively high importance with respect to communication with the receiver from information having relatively low importance. The transmitter maps signatures to the pilot sequences such that pilot sequences having a small shifting value difference therebetween share a specific bit of the corresponding signature. This shared bit is mapped to information with relatively high importance.

The transmitter selects a pilot sequence from the asymmetric sequence set and transmits the selected pilot sequence to the receiver (S3130). The selected pilot sequence corresponds to a signature intended by the transmitter to be transmitted to the receiver and the shared bit and the non-shared bit of the signature are respectively mapped to information with different degrees of importance.

The receiver receives the pilot sequence transmitted from the transmitter (S3140) and acquires additional information indicated by the received pilot sequence (S3150).

5. Apparatus Configuration

Figure 32:
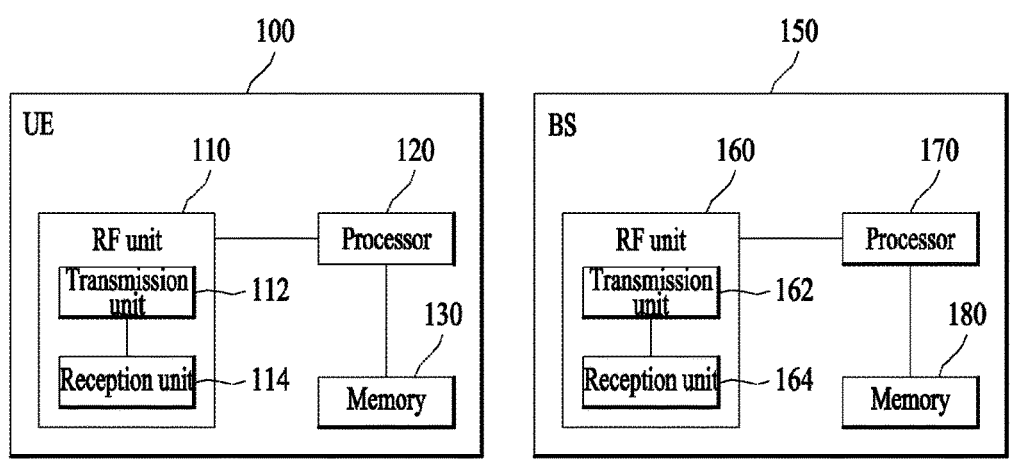
FIG. 32 is a diagram illustrating configuration of a UE and a base station related to an embodiment.

FIG. 32 is a block diagram showing the configuration of a reception module and a transmission module according to one embodiment of the present invention. In FIG. 32, a reception module 100 and the transmission module 150 may include radio frequency (RF) units 110 and 160, processors 120 and 170 and memories 130 and 180, respectively. Although a 1:1 communication environment between the reception module 100 and the transmission module 150 is shown in FIG. 32, a communication environment may be established between a plurality of reception module and the transmission module. In addition, the transmission module 150 shown in FIG. 32 is applicable to a macro cell base station and a small cell base station.

The RF units 110 and 160 may include transmitters 112 and 162 and receivers 114 and 164, respectively. The transmitter 112 and the receiver 114 of the reception module 100 are configured to transmit and receive signals to and from the transmission module 150 and other reception modules and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the reception module 100 may perform the methods of the various embodiments of the present invention.

The transmitter 162 and the receiver 164 of the transmission module 150 are configured to transmit and receive signals to and from another transmission module and reception modules and the processor 170 are functionally connected to the transmitter 162 and the receiver 164 to control a process of, at the transmitter 162 and the receiver 164, transmitting and receiving signals to and from other apparatuses. The processor 170 processes a signal to be transmitted, sends the processed signal to the transmitter 162 and processes a signal received by the receiver 164. If necessary, the processor 170 may store information included in an exchanged message in the memory 180. By this structure, the transmission module 150 may perform the methods of the various embodiments of the present invention.

The processors 120 and 170 of the reception module 100 and the transmission module 150 instruct (for example, control, adjust, or manage) the operations of the reception module 100 and the transmission module 150, respectively. The processors 120 and 170 may be connected to the memories 130 and 180 for storing program code and data, respectively. The memories 130 and 180 are respectively connected to the processors 120 and 170 so as to store operating systems, applications and general files.

The processors 120 and 170 of the present invention may be called controllers, microcontrollers, microprocessors, microcomputers, etc. The processors 120 and 170 may be implemented by hardware, firmware, software, or a combination thereof.

If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 170.

The present invention can also be embodied as computer-readable code on a computer-readable recording medium. The computer-readable recording medium includes all data storage devices that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network coupled computer systems so that the computer readable code is stored and executed in a distributed fashion.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

While the methods of generating and transmitting a pilot sequence have been described on the basis of examples applied to the IEEE 802.11 system and HEW system, the methods can be applied to various wireless communication systems in addition to the IEEE 802.11 system and HEW system.

The invention claimed is:

1. A method of transmitting pilot sequences to a receiver in a wireless communication system, the method performed by a transmitter and comprising:
generating an asymmetric sequence set including a plurality of pilot sequences cyclically shifted at irregular intervals in a frequency domain;

mapping additional information represented by different bit values to the plurality of pilot sequences; and transmitting a pilot sequence selected from the plurality of pilot sequences to a receiver, wherein the plurality of pilot sequences are grouped based on shifting values, and wherein the additional information is represented by a combination of a shared bit mapped as a same value to a specific group of the plurality of pilot sequences and a non-shared bit mapped as different values to each pilot sequence in the specific group.

2. The method of claim 1, wherein generating the asymmetric sequence set comprises changing phases of vector elements indicating pilot signals in a time domain.

3. The method of claim 2, wherein the plurality of pilot sequences are generated by cyclically sifting the pilot signals in units of a fraction.

4. The method of claim 1, wherein the plurality of pilot sequences are grouped such that pilot sequences having a small shifting value difference are grouped.

5. The method of claim 1, wherein:
information belonging to a group with high importance is allocated to the shared bit; and
information belonging to a group with low importance is allocated to the non-shared bit.

6. The method of claim 5, wherein:
the group with high importance includes at least a packet identifier (ID), a basic service set ID (BSSID), uplink transmission scheduling information, downlink transmission scheduling information or bandwidth; and
the group with low importance includes at least a number of transmit antennas, a position of a PDCCH (Physical Downlink Control Channel) or a position of an evolved PDCCH (ePDCCH).

7. The method of claim 1, wherein first additional information is mapped to a first pilot sequence and second additional information having a difference of 1 bit from the first additional information is mapped to a neighboring pilot sequence of the first pilot sequence.

8. A transmission device for transmitting pilot sequences to a receiver in a wireless communication system, the device comprising:
a transmitter configured to transmit signals; and
a processor connected to the transmitter, the processor is configured to:

generate an asymmetric sequence set including a plurality of pilot sequences cyclically shifted at irregular intervals in a frequency domain;

map additional information represented by different bit values to the plurality of pilot sequences; and control the transmitter to transmit a pilot sequence selected from the plurality of pilot sequences to a receiver, wherein the plurality of pilot sequences are grouped on the basis of shifting values, and wherein the additional information is represented by a combination of a shared bit mapped as a same value to a specific group of the plurality of pilot sequences and a non-shared bit mapped as different values to each pilot sequence in the specific group.

9. The device of claim 8, wherein the processor generates the asymmetric sequence set by changing phases of vector elements indicating pilot signals in a time domain.

10. The device of claim 9, wherein the plurality of pilot sequences are generated by cyclically sifting the pilot signals in units of a.

11. The device of claim 8, wherein the plurality of pilot sequences are grouped such that pilot sequences having a small shifting value difference are grouped.

12. The device of claim 8, wherein:
information belonging to a group with high importance is allocated to the shared bit; and
information belonging to a group with low importance is allocated to the non-shared bit.

13. The device of claim 12, wherein:
the group with high importance includes at least a packet identifier (ID), a basic service set ID (BSSID), uplink transmission scheduling information, downlink transmission scheduling information or bandwidth; and
the group with low importance includes at least a number of transmit antennas, a position of a PDCCH (Physical Downlink Control Channel) or a position of an evolved PDCCH (ePDCCH).

14. The transmitter of claim 8, wherein first additional information is mapped to a first pilot sequence and second additional information having a difference of 1 bit from the first additional information is mapped to a neighboring pilot sequence of the first pilot sequence.

* * * * *